US012664235B2

(12) United States Patent
Jain et al.

(10) Patent No.: US 12,664,235 B2
(45) Date of Patent: Jun. 23, 2026

(54) SYSTEMS AND METHODS FOR SAMPLE EFFICIENT TRAINING OF MACHINE LEARNING MODELS

(71) Applicant: THETA LAKE, INC., Santa Barbara, CA (US)

(72) Inventors: Rohit Jain, Ventura, CA (US); Devin H. Redmond, Encinitas, CA (US); Richard B. Sutton, San Mateo, CA (US)

(73) Assignee: THETA LAKE, INC., Santa Barbara, CA (US)

( * ) Notice: Subject to any disclaimer, the term of this patent is extended or adjusted under 35 U.S.C. 154(b) by 1034 days.

(21) Appl. No.: 17/675,442

(22) Filed: Feb. 18, 2022

(65) Prior Publication Data

US 2023/0267175 A1 Aug. 24, 2023

(51) Int. Cl.
| | |
|---|---|
| *G06F 18/214* | (2023.01) |
| *G06F 18/21* | (2023.01) |
| *G06F 18/2113* | (2023.01) |
| *G06F 18/22* | (2023.01) |
| *G06N 3/043* | (2023.01) |

(52) U.S. Cl.
CPC ...... *G06F 18/2155* (2023.01); *G06F 18/2113* (2023.01); *G06F 18/217* (2023.01); *G06F 18/22* (2023.01); *G06N 3/043* (2023.01)

(58) Field of Classification Search
CPC .... G06F 18/2155; G06F 18/22; G06F 18/217; G06F 18/2113; G06N 3/043; G06N 3/0895; G06N 3/091
See application file for complete search history.

(56) References Cited

U.S. PATENT DOCUMENTS

| | | | | |
|---|---|---|---|---|
| 9,990,687 | B1* | 6/2018 | Kaufhold | G06N 3/045 |
| 11,048,979 | B1* | 6/2021 | Zhdanov | G06F 18/2155 |
| 11,790,695 | B1* | 10/2023 | Aggarwal | G06V 40/172 |
| 2003/0078899 | A1* | 4/2003 | Shanahan | G06F 16/353 |
| | | | | 707/E17.09 |
| 2009/0252404 | A1* | 10/2009 | Lecerf | G06F 18/41 |
| | | | | 382/154 |

(Continued)

OTHER PUBLICATIONS

Belkin, Mikhail, Partha Niyogi, and Vikas Sindhwani. "Manifold regularization: A geometric framework for learning from labeled and unlabeled examples." Journal of machine learning research 7.11 (2006). (Year: 2006).*

(Continued)

*Primary Examiner* — Andrew T Chiusano
(74) *Attorney, Agent, or Firm* — Sprinkle IP Law Group

(57) ABSTRACT

Systems, methods and computer program products for sample efficient training of machine learning models are provided. A process may proceed, starting with an initial set of labeled examples and the initial set of unlabeled examples, to label unlabeled examples in an iterative manner, with the input dataset for a next iteration comprising an augmented set of labeled examples from a current iteration and selected unlabeled examples, until a final set of labeled examples is created. The final set of labeled examples is used to train a machine learning model. Each iteration includes mapping the input dataset to a reduced dimension space and using the reduced dimension space to identify high value examples to label.

26 Claims, 27 Drawing Sheets

(56) References Cited

U.S. PATENT DOCUMENTS

| | | | | |
|---|---|---|---|---|
| 2019/0287030 | A1* | 9/2019 | Varughese | ............. G06N 20/00 |
| 2021/0081822 | A1* | 3/2021 | Davidson | ................ G06N 5/04 |

OTHER PUBLICATIONS

Li, Hang, Enrique Del Castillo, and George Runger. "On active learning methods for manifold data." Test 29 (2020): 1-33. (Year: 2020).*

Li, Cheng, Haifeng Liu, and Deng Cai. "Active learning on manifolds." Neurocomputing 123 (2014): 398-405. (Year: 2014).*

Sreenivasaiah, Deepthi, Johannes Otterbach, and Thomas Wollmann. "Meal: Manifold embedding-based active learning." Proceedings of the IEEE/CVF International Conference on Computer Vision. 2021. (Year: 2021).*

McInnes, L, Healy, J, UMAP: Uniform Manifold Approximation and Projection for Dimension Reduction, ArXiv e-prints 1802. 03426v3, 2020, 63 pgs.

* cited by examiner

700

1000

1200

Start

1202 — Determine Labels and Confidences to Unlabeled Data Points

1204 — Identify n Data Points Having Lowest Confidence Levels as Data Set of Interest 1205 — Set Lowest Confidence Labels as Temporary Labels for n Data Points 1206 — Provide Temporary Labels for Data Set of Interest for Verification Next Data Point 1208 — Label Verified No → 1212 — Receive New Label as Training Label Yes 1210 — Keep Temporary Label as Training Label 1214 — Additional Data Point Yes No End

FIG. 12

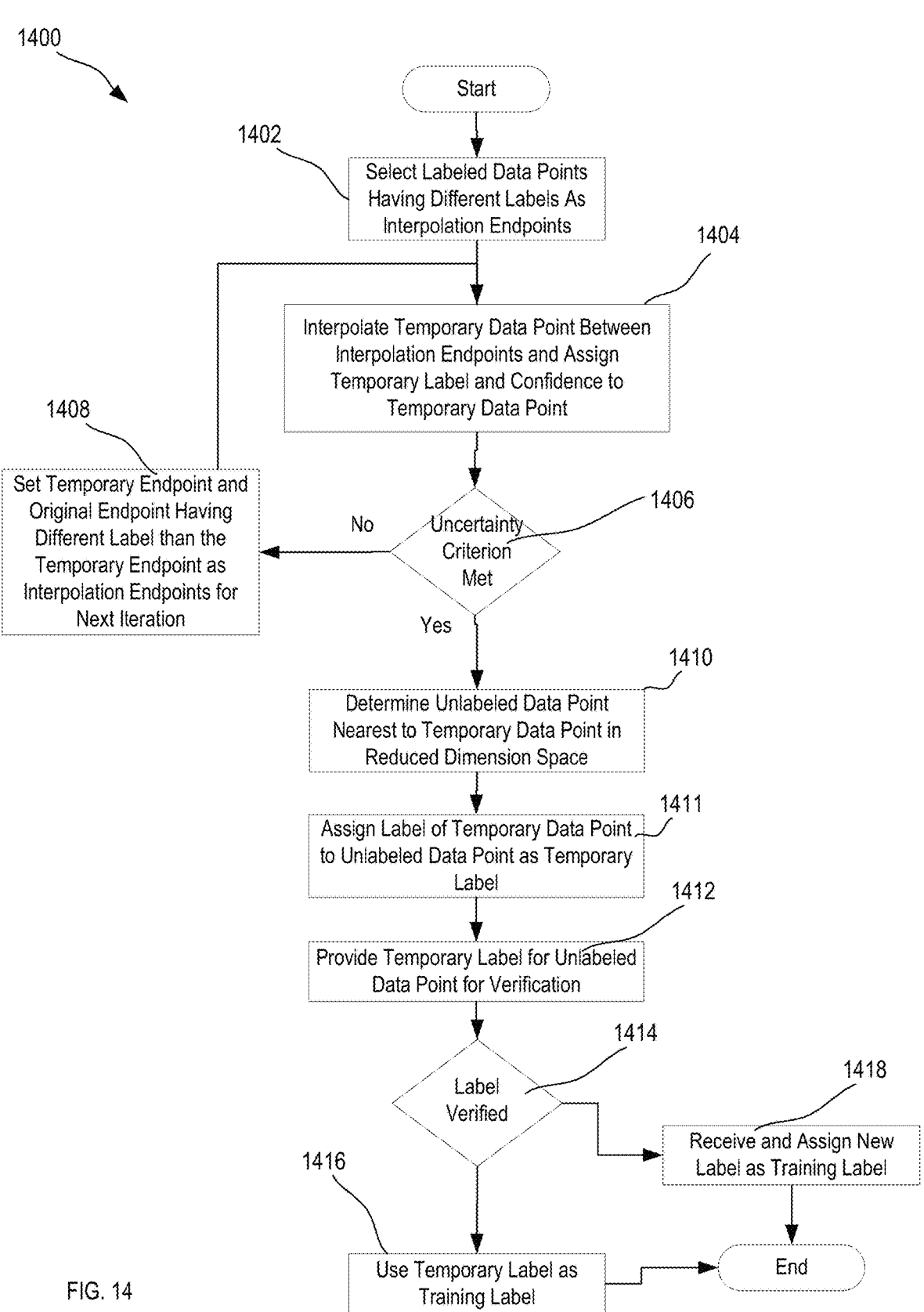

1400

1402

Start

Select Labeled Data Points Having Different Labels As Interpolation Endpoints

1404

Interpolate Temporary Data Point Between Interpolation Endpoints and Assign Temporary Label and Confidence to Temporary Data Point

1408

Set Temporary Endpoint and Original Endpoint Having Different Label than the Temporary Endpoint as Interpolation Endpoints for Next Iteration No Uncertainty Criterion Met

1406

Yes

1410

Determine Unlabeled Data Point Nearest to Temporary Data Point in Reduced Dimension Space

1411

Assign Label of Temporary Data Point to Unlabeled Data Point as Temporary Label

1412

Provide Temporary Label for Unlabeled Data Point for Verification

1414

Label Verified

1418

Receive and Assign New Label as Training Label

1416

Use Temporary Label as Training Label

End

FIG. 14

SYSTEMS AND METHODS FOR SAMPLE EFFICIENT TRAINING OF MACHINE LEARNING MODELS

TECHNICAL FIELD

The present disclosure relates to machine learning. More particularly, embodiments described in the present disclosure relate to selection and labeling of training data. Even more particularly, embodiments described in the present disclosure relate to selection and labeling of training data to train a machine learning model in a sample efficient manner.

BACKGROUND

Modern machine learning (ML) algorithms require a large amount of labeled training data to generate ML models capable of accurate and robust predictions because models built with small datasets tend to be less accurate than those built with larger datasets. In many cases training data is labeled by human labelers. In fact, a whole technology area has developed to crowdsource human labeling of training data, with some post-processing to reconcile the inevitable conflicts and potential errors. Human labeling of data, however, is time consuming and error prone and often results in lowered accuracy of labeling. This is particularly problematic when the labels require fine judgment of context and meaning of abstract concepts as the effect of human variance and errors gets magnified.

Active learning is a type of machine learning that includes both automated labeling of examples and human labeling of examples. Active learning techniques typically use the model under development, and potentially other ancillary models, to automatically label training data, in combination with selecting examples for human labeling. However, using the model itself to create labels for training can perpetuate false confidence detections and bias the labels, which results in lower model performance and robustness. For example, the model biases can lead to false confidence in the labels.

While active learning techniques may reduce the number of examples that require human labeling, current active learning schemes can be very resource and time intensive and result in inefficient processing for a given degree of model accuracy or robustness. One reason for this is that the large datasets collected for training typically include many records that are not very diverse from each other, at least from a model training standpoint, resulting in a large portion of the computing resources (e.g., processing power/memory/cycles) being expended labeling uninformative examples and routing uninformative examples to human labelers for labeling, and using the uninformative examples when training the ML model under development. Moreover, the model under development may be fairly complex, requiring a large amount of time and computer resources to automatically label training data using that model, while potentially biasing the labels.

New paradigms for labeling training data and training models are therefore required.

SUMMARY

Not all data is equally valuable for model training. At any given time during a model's incremental development, different types of data are more informative and relevant while other subsets of the data may not be useful at all. The process of collecting example data for training, however, typically does not discriminate informative from uninformative examples, resulting in training datasets that include many uninformative or minimally informative examples. Consequently, a large portion of the time, computational resources, human resources and cost spent labeling the training data goes to data that will not meaningfully impact the final ML model and, similarly, a large portion of the computational resources and time spent on training an ML model is wasted on training using uninformative examples.

To address these concerns pertaining to labeling training data and training machine learning (ML) classifiers, attention is now directed to embodiments of systems and methods for labeling training data and training ML models disclosed herein. In particular, the present disclosure relates to systems and methods for labeling training data to train ML models in a sample efficient manner that reduces or minimizes the need for human labeling.

Various embodiments may include labeling a set of unlabeled training data in an iterative manner. For example, embodiments may proceed, starting with an input dataset that comprises an initial set of labeled examples and a subset of unlabeled examples, to label the set of unlabeled examples in an iterative manner. The input dataset for each subsequent iteration may comprise an augmented set of labeled examples from the current iteration and a selected subset of unlabeled examples. Each iteration may include mapping the input dataset of labeled examples and unlabeled examples to a reduced-dimension space. Each iteration may further include using the reduced-dimensions space to identify target examples and assigning training labels to the target examples, which may be escalated to a human user for verification. Training labels may be assigned based on the results of the verification by the user—that is whether the user verified or corrected the temporary labels. For example, if the result of a verification indicates that a user verified a temporary label, the temporary label may be set as the training label for a training example. On the other hand, if the result of the verification indicates a selection of an alternate label for a training example, the alternate label may be assigned to the training example as a training label. Embodiments can further include training a machine learning model with the final set of labeled examples.

Identifying a target example for labeling or verification may include identifying a target data point from the reduced-dimension data space, where the target data point corresponds to the target example. Identifying the target data point may include determining a distance of an unlabeled data point to a nearest labeled data point in the reduced-dimension space, where the target data point is identified based on the distance from the unlabeled data point to the nearest labeled data point. Assigning the temporary label may comprise assigning the label of the nearest labeled data point to the unlabeled data point as the temporary label. The temporary label may be presented to a user for verification More particularly, identifying the target data point can include determining the distance of the unlabeled data point to a plurality of nearest labeled data points and identifying the unlabeled data point as the target data point based on the distances from the unlabeled data point to the plurality of nearest labeled data points. Assigning the temporary label to the target data point may comprise applying a labeling rule to assign a label from the plurality of nearest labeled data points as the temporary label.

Identifying a target data point may comprise assigning a temporary label and a confidence score for the temporary label to an unlabeled data point. The target data point may be identified based on the confidence score.

In yet another embodiment, determining a target example for labeling and verification may include an iterative process of interpolating temporary data points. For example, some embodiments may proceed, starting with a pair of labeled data points with differing labels as a set of interpolation endpoints, to interpolate a temporary data point between the set of interpolation endpoints and assigns a label to the temporary data point (labels determined for temporary data points are referred to as temporary data point labels herein) and a confidence score in an iterative fashion, with the temporary data point and an endpoint from the set of interpolation endpoints that has a different label than the temporary data point acting as the set of interpolation endpoints for a next iteration, until a confidence score criterion is met. Based on a determination that the confidence score criterion is met, an unlabeled data point may be selected as the target data point based, for example, on its proximity to the temporary data point that met the confidence score criterion. Assigning the temporary label may comprise assigning the temporary data point label of the interpolated temporary data point as the temporary label.

In some embodiments, a potentially mislabeled data point can be identified. In even more particular embodiments, a potentially mislabeled example can be identified by identifying a labeled data point from the reduced-dimension space based on the labels of other proximate labeled data points. For example, if some number of the closest labeled data points have a different label than the labeled data point, then that data point can be identified for verification. As such, the previously assigned label for the data point may be verified or corrected by a user. Based on a verification result indicating that the user verified the previously assigned label, the previously assigned label is maintained as the training label for the example represented by the data point. On the other hand, if the verification result indicates that the user has selected another label for the example, the label selected by the user can be assigned to the example as the training label.

Embodiments may include presenting a target example to a user based on user interaction with the reduced-dimension space and receiving an indication of a user-selected label to be assigned to the target example as the training label. For example, embodiments may include providing a graphical user interface representing the reduced-dimension space, such that a target example can be identified based on user interaction with the graphical user interface to select a target data point corresponding to the target example. The training label may be assigned to the target example based on the user selecting the training label for the target example.

As discussed, various embodiments may map labeled and unlabeled examples to a reduced-dimension space. The reduced-dimension space facilitates the selection of high value data points, minimizing human labeling and increasing computer efficiency to generate a high accuracy ML model by reducing or eliminating processing and other resource usage associated with the labeling of and training using uninformative examples.

Some embodiments apply topographical mapping with fuzzy rule matching and calculation of text similarity using neural network embeddings to facilitate capturing the best data to label and to generate a machine learning model that combines diverse machine learning techniques so that the biases of these techniques get reduced or canceled out, resulting in an accurate, robust classifier built with minimal amounts of labeled data. Fuzzy rule matching, topographical mapping, classifier training and deep neural embeddings have different inductive biases and distinct theories and models regarding the learning process. Therefore, combin-ing them together serves to reduce bias by compensation of one approach against another and increases diversity leading to strong improvements in accuracy and robustness, while reducing the amount of data required to train the model.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 12 is a flow chart illustrating one embodiment of a process to identify and label low confidence data points;

FIG. 14 is a flowchart illustrating one embodiment of a process for labeling unlabeled data points based on an uncertainty criterion;

DETAILED DESCRIPTION

Figure 1:
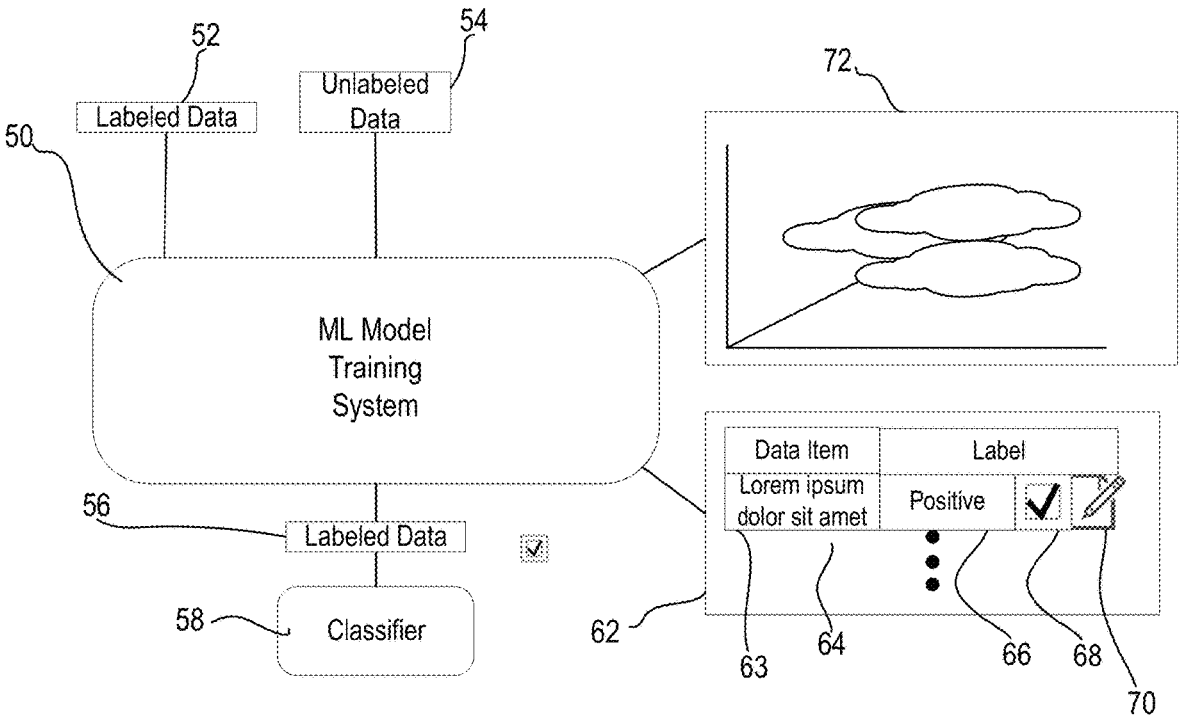
FIG. 1 is a diagrammatic representation of one embodiment of a system for labeling training data and training a machine learning model.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before delving into more details regarding the specific embodiments disclosed herein, some context may be helpful. The training data used to train machine learning (ML) classifiers often includes vast amounts of uninformative data that can easily overwhelm human labelers and active learning schemes. Moreover, active learning technologies often use the model being developed to label training data, resulting in bias.

The present disclosure provides systems and methods for selecting and labeling training data and for training machine learning (ML) models in a sample efficient manner. Aspects of the present disclosure also relate to building accurate and robust machine learning models with minimal human labeling of training data while ensuring that the data selected for labeling at each incremental step is that which is predicted to most impact model accuracy and robustness.

Further, aspects of the present disclosure relate to using combinations of techniques having different inductive biases to label training data and train ML models to reduce or eliminate model bias while still allowing human labeling to be reduced or minimized. In some embodiments, fuzzy rules-based labeling is combined with dimension reduction, and various techniques for selecting and labeling training data. In some embodiments, fuzzy rules-based labeling can be performed as described in U.S. patent application Ser. No. 17/570,878, entitled "System and Method for Querying of Unstructured Text Using Graph Analysis," filed Jan. 7, 2022, which is hereby fully incorporated herein by reference.

Aspects of the present disclosure also relate to classifying text segments according to categories, such as, but not limited to, abstract categories that include multiple semantic concepts. Non-limiting examples of labeling text segments according to abstract categories are described in U.S. patent application Ser. No. 17/192,351, entitled "Systems and Methods for Determining and Using Semantic Relatedness to Classify Segments of Text," which is hereby fully incorporated herein by reference.

An ML labeler may be trained, for example, to classify text segments as a positive match or a negative match (not a match) to one or more abstract categories or other categories. In some embodiments, the ML classifier can be trained to label text segments as positive or negative for semantic concepts within an abstract category as well as or instead of labeling with respect to an overall abstract category. Furthermore, binary labeling is just one example of labeling and embodiments may support any number of labels. By way example, but not limitation, if an abstract category has three semantic concepts, a classifier can be trained with a label space for the category of 0, 1, 2, 3, where 0 represents that the text segment is negative for the abstract category, and 1-3 represent respective semantic concepts in the category (and implicitly represent a positive match to the abstract category). It will be further appreciated that embodiments of the present disclosure may be used to train classifiers against any number of categories and semantic concepts. Furthermore, embodiments of the present disclosure may be used to label training data for training on other types of classes and to label various types of data (e.g., text, images, or other data).

FIG. 1 is a block diagram providing a diagrammatic representation of one embodiment of a machine learning (ML) model training system 50 for training ML models. ML model training system 50 may be implemented on a computer system, including, but not limited to, a server or servers of a cloud computing platform. In some embodiments, ML model training system 50 is implemented by a computer system executing computer-executable instructions.

ML model training system 50 uses already labeled training data 52 in a process to label unlabeled training data 54 to generate a set of labeled training data 56 used to train an ML model, such as ML classifier 58. As will be appreciated the training data can depend on the type of classifier being trained and other factors, and various embodiments may be applied to a wide variety of training data. By way of example, but not limitation, the training data may include text, images, audio recordings, video recordings or other types of data.

ML model training system 50 utilizes human labelers, automated labelers, or combinations thereof. The labels generated by one labeler (e.g., a human or automated labeler) can be provided for evaluation and potential correction to another labeler (e.g., a human or more accurate automated labeler). More particularly, according to some embodiments, ML model training system 50 applies a combination of automatic labeling with human evaluation and possible correction to generate labeled training data 56. To this end, ML model training system 50 can include a verification interface 62 that provides a graphical user interface through which a user may be queried to review and either verify, correct, or take other actions with respect to assigned labels. For example, verification interface 62 may present the user with labeled examples, such as labeled example 63—in this example, an example text segment 64 is assigned a label 66 of "positive"—and tools to verify that the label is correct (e.g., checkbox 68) and to change the label (e.g., edit tool 70).

The process of labeling unlabeled training data using already labeled training data 52 may be an iterative process that can begin with a relatively small initial set of labeled training data 52. The set of labeled training data 52 is augmented through the successive iterations until a set of labeled training data 56 that can be used to train the ML classifier 58 is generated.

Various techniques can be used to label the examples in the initial dataset of labeled training data 52, such as human labeling, automated labeling or a combination thereof. For example, an automated labeler, such as a simple machine learning classifier that can classify easy cases with a high degree of confidence, a hard-coded rules labeler or another labeler may be used to label a subset of unlabeled training data 54 to generate the initial set of labeled training data 52. In some embodiments, ML model training system 50 generates the initial set of labeled training data 52 using a fuzzy rules-based labeler to label a subset of unlabeled training data 54. Generating the labels for the initial labeled training data 52 using an automated labeler and then having the labels evaluated and potentially corrected by a human labeler typically takes less time and is more accurate than having a human labeler assign the labels to unlabeled data from scratch.

The labeled training data 52 is used to identify potentially high-value unlabeled data items to label and, in some cases, potentially mislabeled data items. As will be appreciated, however, each item of labeled training data and each item of unlabeled training data may be represented by a respective high dimension feature vector or other high dimensional data structure that would otherwise make visualizing and evaluating the data difficult, resource intensive to the point of being impractical if not impossible. It is not uncommon for items of training data to have hundreds if not thousands of dimensions.

According to one aspect of the present disclosure, labeled and unlabeled training data is mapped to a reduced-dimension data space that can be used to identify high value unlabeled examples more efficiently for labeling when compared to using a higher dimension space. The reduced-dimension data space includes data points representing the labeled examples from an input dataset (referred to a labeled data points) and data points representing the unlabeled examples from the input dataset (referred to as unlabeled data points herein). For example, say the set of labeled training data 52 and the unlabeled training data 54 are a set of labeled text segments and a set of unlabeled text segments respectively, and each text segment is represented by a feature vector having 512 dimensions, then the 512 dimension feature vectors representing the text segments in a dataset may be reduced to a 2D representation, a 3D representation, or another reduced-dimension representation of the dataset, with the reduced-dimension representation including labeled data points representing the labeled text segments and unlabeled data points representing the unlabeled text segments.

In particular embodiments, ML model training system 50 performs dimension reduction using manifold learning techniques. As will be appreciated, manifold learning techniques generally attempt to describe datasets as low-dimensional manifolds embedded in high-dimensional spaces, where a manifold is topological space that locally resembles Euclidean space near each point. The ML model training system 50 makes use of labeled training data and unlabeled training data to determine the shape of the manifold, which can then be used to find additional informative examples to label.

One technique for mapping examples to a reduced-dimension data space is uniform manifold approximation and projection (UMAP), which is a general-purpose manifold learning and dimension reduction algorithm. The details behind UMAP are described in McInnes, L, Healy, J, UMAP: Uniform Manifold Approximation and Projection for Dimension Reduction, ArXiv e-prints 1802.03426v3, 2020, which is hereby fully incorporated by reference herein. In embodiments of the present disclosure, the UMAP mappings can make use of the labeled and the unlabeled training data to determine the shape of the manifold. Other embodiments may apply other dimension reduction techniques known or developed in the art in addition to or in the alternative to UMAP.

As mentioned, the manifold (or other reduced-dimension space) can be used to find additional examples—preferably, highly informative examples—to label. For example, the reduced-dimension data space can allow a user or automated process to identify "hard examples" for labeling such as examples that are close to the decision boundary of a model, unlabeled examples that are in areas with few or no labeled examples, and examples that are likely to have been mislabeled (e.g., examples that are in a cluster of examples of a different class).

In some embodiments, ML model training system 50 maps labeled training data and unlabeled training data to a reduced-dimension data space that can be used for visualization of the dataset, such as a 2D or 3D representation of a dataset. ML model training system 50 may include a visualization interface 72 that provides a graphical user interface for viewing the reduced-dimension dataset. In some embodiments, visualization interface 72 provides tools to allow a user to select and label data points from reduced-dimension dataset, thus providing a mechanism for the user to manually select and label items of training data. For example, using the visual representation of the reduced-dimension data space, the user can select graphically high value examples to label, such as labeled examples near or in the middle of a cluster of examples that have a different label, or unlabeled examples that are in areas where there are relatively few (or no) labeled examples.

In addition to (or instead of) using a reduced-dimension data space for visualization, ML model training system 50 may use a reduced-dimension data space to facilitate automated selection of data points by a selection model for labeling. For example, the reduced-dimension data space may be used to select data points for automated labeling, human labeling, or a combination thereof, such as automated labeling with human verification. In such embodiments, ML model training system 50 includes a selection model to select and, in some cases, label data points. By way of example, but not limitation, the selection model may comprise one or more machine learning models, potentially including an ensemble of sub-models, trained to identify high value examples for labeling and to automatically label the examples. In various embodiments, the selection model may implement fast distance/nearest-neighbor calculations to identify labeled examples that are predicted as being mislabeled or to identify unlabeled examples in an area that has few (or no) labeled examples. Further, the selection model may identify data points for labeling that are close to the decision boundary of a model—for example, examples that have a low confidence or high uncertainty with respect to labeling.

It can be noted that the selection model may use a reduced-dimension data space that has a different number of dimensions than the data space used for visualization. By way of example, but not limitation, the 512 Dimensions in the example above may be mapped to a 2D or 3D data space for evaluation by the selection model. In a particular embodiment, ML model training system 50 maps the dataset to be evaluated by the selection model to the reduced-dimension data space deemed optimal by the UMAP algorithm for the dataset.

In some embodiments, visualization and evaluation by a selection model are both involved in identifying data points for labeling or verification. For example, in addition to (or instead of) providing tools to allow the user to manually select and label data points, visualization interface 72 may provide tools to allow the user to select areas of interest for evaluation by an automated selection model. The dataset corresponding to an area of interest selected in the visualization interface 72 is then evaluated by the automated selection model to identify high value data points for labeling or verification. As discussed above, in some embodiments, the dataset may be mapped to a different reduced-dimension data space for processing by the selection model. In other embodiments, the selection model can evaluate the data points in a 2D space or 3D space as used for visualization.

Further, in some embodiments, the visualization step may be omitted. For example, ML model training system 50 may perform dimension reduction on a dataset and input the entire reduced-dimension dataset or algorithmically selected portions of the dataset for evaluation by a selection model. In this case, the dataset can be mapped to a reduced-dimension data space used by the selection model, which may not, in some cases, be suitable for visualization. By way of example, but not limitation, the dataset may be reduced to a space determined to be optimal by the UMAP algorithm.

The process of labeling training data can involve multiple iterations of mapping an input dataset that contains a set of labeled training data 52 (potentially as augmented by prior iterations) and a subset of unlabeled training data 54 to a reduced-dimension data space, using the reduced-dimension data space to identify data points to label, labeling the identified data points through manual labeling, automated labeling, or a combination thereof. The labeled examples generated by the iterative process (e.g., labeled training data 56) are used to train ML classifier 58.

In operation then, ML model training system 50 combines labeled training data 52 with a larger subset of unlabeled training data 54 to create an input dataset for dimension reduction. The input dataset is mapped to a reduced-dimension space—for example, a reduced-dimension manifold representation. As mentioned, the manifold (or other reduced-dimension space) can be used to find additional examples—preferably, highly informative examples—to label. For example, the reduced-dimension data space can allow a user or automated process to identify "hard examples" for labeling, such as examples that are close to the decision boundary of a model, unlabeled examples that are in areas with few or no labeled examples, and labeled examples that are likely to have been mislabeled (e.g., examples that are in a cluster of examples of a different class). In some embodiments, ML model training system 50 applies a selection model to generate a relatively small set of additional labeled training data, which can be evaluated and potentially corrected by a human user, thus augmenting the labeled training data 52.

ML model training system 50 iterates over mapping the combination of labeled training data 52 as augmented by prior iterations and subsets of unlabeled training data 54 to a reduced-dimension data space, receiving labels from or a user (e.g., via the visualization interface 72) or using the selection model to generate additional labeled data, and providing the labeled data for evaluation and possible correction by a user, to generate labeled training data 56 that is used to train ML classifier 58. In some embodiments, iterations may include training the selection model using the labeled training data 52 (as augmented by prior iterations) and using the trained model to generate additional labeled training data for the current iteration.

The iterative process of labeling training data can continue until a stopping condition is met, such as performing a certain number of iterations, collecting a threshold amount of labeled training data 56 or satisfying another criterion. The process of generating labeled training data 56 may be repeated to train ML classifier 58 as needed or desired.

Each iteration leads to more accurate models from a more diverse and a more informative dataset. This virtuous cycle can combine multiple techniques to reduce bias. By way of example, but not limitation, the labeling process can combine machine learning models, fuzzy rules detection, topographical manifold approximation, and deep neural embeddings, which tends to compensate for the biases of the individual techniques to enhance accuracy and robustness with minimal human intervention.

Some embodiments apply topographical mapping with fuzzy rule matching and calculation of text similarity using neural network embeddings to facilitate capturing the best data to label and to generate a classifier that combines very diverse machine learning techniques so that the biases of these techniques get reduced or canceled out, resulting in an accurate, robust classifier built with minimal amounts of labeled data. These varying approaches have different inductive biases and distinct theories and models regarding the learning process. Therefore, combining them together serves to reduce bias by compensation of one approach against another and increases diversity leading to strong improvements in accuracy and robustness, while reducing the amount of data required to train the model.

Figure 2:
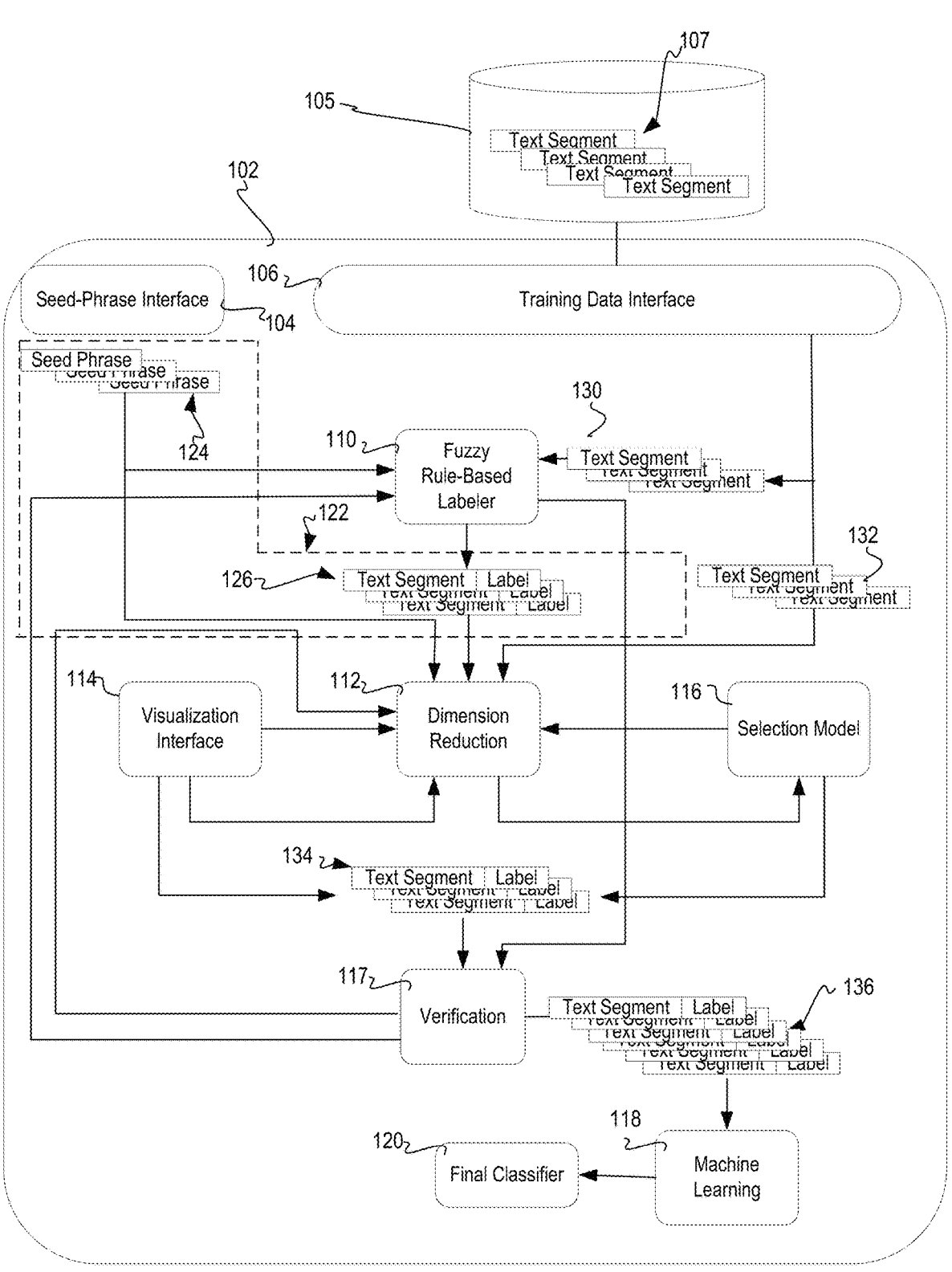
FIG. 2 is a diagrammatic representation of another embodiment of a system for labeling training data and training a machine learning model.

FIG. 2 is a block diagram providing a diagrammatic representation of one embodiment of a machine learning (ML) model training system 102 for training ML models. ML model training system is one example embodiment of an ML model training system 50. Model training system automatically labels training examples and facilitates verification of assigned labels to develop a dataset to train a machine learning classifier 120 in a sample efficient manner. ML model training system 102 may be implemented on a computer system, including, but not limited to, a server or servers of a cloud computing platform.

ML model training system 102 includes a seed phrase interface 104 (e.g., a graphic user interface, a command line interface, an API, a ReST interface, or other interface) through which seed phrases can be input to ML model training system 102, a training data interface 106 (e.g., a graphic user interface, a command line interface, a ReST interface, an API or other interface) via which ML model training system 102 ingests unlabeled data (e.g., from a data store 105 of unlabeled text segments, via a data stream, or from another source) for labeling, a fuzzy rules-based labeler 110, a dimension reduction component 112, a visualization interface 114, a selection model 116, a verification interface 117 and an ML model training component 118. In some embodiments, these components may execute independently from each other (e.g., as separate processes on a processor, on different processors, etc.), or two or more components may be part of the same executing process.

As will be appreciated, various operations on labeled and unlabeled examples are performed using numerical representations of the examples. More particularly, each training example (e.g., each item of text, each image, each audio segment) is embedded as a feature vector that represents the features of the example. Various embeddings known or developed in the art may be used based, for example, on the type of training data, the characteristics of the embedding and other factors.

In the illustrated embodiment, ML model training system 102 is used to train classifiers to label text segments according to categories. The text segments are embedded as numerical representations. The text segments can be embedded using any suitable text embedding technique. By way of example, but not limitations, text segments and other collections of text can be embedded as described in U.S. patent application Ser. No. 17/192,351, entitled "Systems and Methods for Determining and Using Semantic Relatedness to Classify Segments of Text," which is hereby fully incorporated herein by reference. In some embodiments, text segments are embedded prior to being stored in data store 105. In addition, or in the alternative, ML model training system 102 can implement an embedding process (e.g., as part of an interface, fuzzy rules-based labeler 110, dimension reduction component 112 or elsewhere) to transform a set of text (such as a text segment or other sets of text) into numeric representations. By way of example, but not limitation, an embedding process converts each word in a text segment into a vector of real numbers representing that word, thus generating a set of vectors representing the segment. The vectors for a segment can be aggregated into a combined structure (e.g., vector, array or other structure) representing the text segment.

Any number of word embeddings (e.g., full word embeddings or sub-word embeddings), or other types of embeddings, such as contextual or phrase embeddings may be used. Multiple embeddings may be combined in many ways ranging from simple concatenation to complex non-linear transformations. Further, various embedding techniques may be used including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification. Some embodiments can use techniques of transfer learning to leverage such pre-trained embeddings. In some embodiments, the transfer learning can include fine tuning to a specific application domain. In other embodiments, transfer learning is performed without fine tuning. Other machine learning techniques may also be used. According to one embodiment, distilBERT embeddings are used, though other embedding techniques or combinations thereof may be used.

Further, there are a number of commercially available cloud-based, word embedding systems that may be leveraged. In some embodiments, the embedding process may send text to an external embedding system and receive the embedded text from the external system.

ML model training system 102 can be used to train a classifier against multiple categories or to train multiple classifiers. For the purpose of example, however, ML model training system 102 will be discussed in terms of training ML classifier 120 to label text segments as "positive" or "negative" matches (e.g., as "1" or "0") to a single category. In this example, text segments can have the following states with respect to the category: unlabeled, positive, or negative. Further, a label (e.g., "positive"/"negative") may be a temporary label or a training label. A temporary label is a label to be verified before being used for training of an ML model, such as ML classifier 120. A temporary label can be converted to a training label through a verification process. A training label is a non-temporary label for use in training an ML model such as ML classifier 120 (here non-temporary is not meant to imply that a training label is immutable or cannot be changed at some point, but simply that the system does not treat it as a temporary label that requires verification). Again, however, binary labeling is just one example of labeling and embodiments described herein may be applied to training classifiers that have multiple categories and any number of labels per dimension/category. Furthermore, aspects of the present disclosure may be used to label training data to train ML classifiers to classify various types of data, including, but not limited to, text and images.

ML model training system 102 implements an iterative process that uses labeled training data 122 to identify potentially high-value unlabeled text segments to label and, in some cases, to identify potentially mislabeled data items for correction. It can be noted that the generation of the initial set of data used as labeled training data 122 may occur sometime before it is used for the iterative process. Moreover, the initial set of labeled data may be generated remotely from the system that implements the iterative labeling process and then imported or otherwise input to the labeling process. Initially, the set of labeled training data 122 may be relatively small, but it can be augmented through the iterative process with labeled text segments 134 labeled by human labeling, automated labeling or a combination thereof.

The mechanisms to produce the initial examples used as labeled training data 122 can vary by implementation and the type of training data being used (e.g., text vs images). The initial examples used as labeled training data 122 can be labeled, for example, by a human labeler, an automated labeler, such as a machine learning classifier or other automated labeler, or combinations thereof. In the illustrated embodiment, the labeled training data 122 used for the iterative labeling process initially includes labeled text segments 126, where the labeled text segments 126 are generated by fuzzy rules-based labeler 110 labeling a subset of unlabeled text segments (e.g., labeling unlabeled text segments 130 to generate labeled text segments 126).

Seed phrases 124 are used to seed fuzzy rules-based labeler 110. In some embodiments, seed phrases 124 are labeled according to the label space for which ML classifier 120 is being trained and used as part of the initial set of labels. For example, if ML classifier 120 is being trained to classify text segments as positive or negative for a "Risky Behavior" category, then seed phrases 124 may represent positive (or negative) examples of "Risky Behavior". Thus, seed phrases 124 may also be included as in the initial set of examples used as labeled training data 122.

To generate labeled text segments 126, fuzzy rules-based labeler 110 labels examples as matching classes (labels) against which the ML classifier 120 is being trained, based on the fuzzy rules themselves as well as application of those rules to a relatively small subset of the unlabeled data. According to some embodiments, fuzzy rules-based labeler 110 labels text segments using fuzzy matching as described in U.S. patent application Ser. No. 17/570,878, entitled "System and Method for Querying of Unstructured Text Using Graph Analysis," filed Jan. 7, 2022, which is hereby fully incorporated herein by reference. In such embodiments, fuzzy rules-based labeler 110 is configured with a set of seed phrases 124 to use as query strings for a category. The set of seed phrases 124 may be relatively small (e.g., for example, a dozen or less), though any number of seed phrases may be used. Fuzzy rules-based labeler 110 looks for fuzzy matches to the seed phrases 124 in each unlabeled text segment 130 using graph analysis. If a match of a text segment to a seed phrase 124 is identified—for example, if a predetermined threshold related to a query string is met— fuzzy rules-based labeler 110 labels the text segment as positive for the category. If an evaluated text segment does not qualify as a match for the category, the text segment is labeled as "negative" for the category by the fuzzy rules-based labeler 110. In some cases, this "negative" labeling may be implicit based on fuzzy rules-based labeler 110 not labeling a text segment that it evaluated as positive. In some embodiments, fuzzy rules-based labeler 110 also provides a confidence score that relates to the system's confidence that the marked text matches or does not match the category. In some embodiments, fuzzy rules-based labeler 110 is configured with seed phrases for multiple categories such that it labels text segments according to multiple categories.

As another example, fuzzy rules-based labeler 110 uses semantic matching and calculation of text similarity using embeddings to label training examples. U.S. patent application Ser. No. 17/192,351 describes some example embodiments of determining the relatedness of a text segment to a defined collection of text (such as, a semantic concept). As described in U.S. patent application Ser. No. 17/192,351, determining the relatedness of a text segment to a defined collection of text can include projecting an embedded text segment onto or otherwise evaluating the embedded text segment against an embedded collection of text (e.g., an embedded semantic concept). In an even more particular example, fuzzy rules-based labeler 110 determines a semantic relatedness score for a text segment and a defined collection of text by projecting or otherwise evaluating an embedded text matrix for the text segment against a matrix representing the embedded collection of text. Various rules can be applied to the relatedness score(s) determined for a text segment including, but not limited to those described in U.S. patent application Ser. No. 17/192,351.

Using the example in which ML classifier 120 is being trained to label text segments as "positive" or "negative" for a "Risky Behavior" category, then fuzzy rules-based labeler 110 can be configured with a category of "Risky Behavior," which includes a logically defined collection of text (e.g., a logically defined collection of words, phrases, sub-words) that represents positive examples of "Risky Behavior". The fuzzy rules-based labeler 110 determines the semantic similarity of unlabeled text segments to the logically defined collection of text for "Risky Behavior" using, for example, neural network embeddings or other embeddings.

In some embodiments, fuzzy rules-based labeler 110 is adapted to label text segments based on an abstract category. As described in U.S. patent application Ser. No. 17/192,351, an abstract category comprises a defined logical collection of semantic concepts, where each semantic concept comprises a defined logical collection of words or phrases. For example, "Risky Behavior" may comprise a defined collection of semantic concepts, where each semantic concept includes a logically defined collection of semantically related words or phrases that potentially relates a different type of risky behavior than to which the other semantic concepts in the category relate.

When evaluating an example text segment against a category that comprises semantic concepts, fuzzy rules-based labeler 110 determines a relatedness score for the text segment for each semantic concept. Fuzzy rules-based labeler 110 determines whether to label the text segment as matching the category based on the relatedness scores for that text segment to the semantic concepts in a category. In some embodiments, a text segment is labeled with the category if it is semantically related to any of the concepts of the category (e.g., the relatedness score for a concept is above a threshold or another criterion for determining that text segment is semantically related to a concept is met).

Other rules may also be defined. For example, labeling an example text segment may depend on the number or percentage of concepts to which the text segment is related, the degree of the semantic relationships between the segment and the concepts, or other factors. If an evaluated text-segment does not qualify as a match for the category, the text segment is labeled as "negative" for the category by the fuzzy rules-based labeler 110. In some cases, this "negative" labeling may be implicit based on fuzzy rules-based labeler 110 not labeling a text segment that it evaluated as positive.

It can be noted that, in some embodiments, fuzzy rules-based labeler 110 may also label a text segment as positive or negative for the individual semantic concepts within a category. For example, fuzzy rules-based labeler 110 may label a text segment as a positive match for a semantic concept if the relatedness score for that segment/concept pair is above a threshold or based on other criteria. Depending on implementation, the semantic concept label may be used for training (for example, if a downstream classifier is being trained to label against the semantic concepts in addition to (or instead of) the broader abstract category). In other embodiments, fuzzy rules-based labeler 110 does not label text segments with semantic concepts but uses the relatedness of the text segment to the semantic concepts to determine whether to label the text segment as matching the category, as described above for example.

The abstract categories of fuzzy rules-based labeler 110 are seeded with seed phrases 124. The seed phrases 124 may be derived from data or provided by a user with domain expertise. The set of seed phrases 124 may be relatively small. For example, each semantic concept defined at fuzzy rules-based labeler 110 may be seeded with a dozen or less words or sentences, though any number of seed phrases may be used.

In operation, ML model training system 102 ingests a set of unlabeled examples, (e.g., unlabeled text segments 130 selected at random or according to another selection scheme) and inputs them to fuzzy rules-based labeler 110 for labeling. Fuzzy rules-based labeler 110 labels the unlabeled text segments 130 that are a positive match to a category. In some embodiments, fuzzy rules-based labeler 110 also explicitly labels the unlabeled text segments that are not a positive match to the category as negative for the category. In other embodiments, fuzzy rules-based labeler 110 implicitly labels text segments as negative for a category in that subsequent processing steps consider the text segments that were evaluated by fuzzy rules-based labeler 110 but not labeled as a positive match for the category as being labeled as negative for the category.

In some embodiments, the labels assigned by fuzzy rules-based labeler 110 to the text segments are treated as training labels that do not require verification. In other embodiments, the labels assigned by fuzzy rules-based labeler 110 are considered temporary labels that require verification. For temporary labels, ML model training system 102 queries a user (e.g., via a verification interface 117) to review some or all of the examples labeled by fuzzy rules-based labeler 110. Verification interface 117 presents, to a user, each example text segment evaluated by fuzzy rules-based labeler 110 (or a selected subset thereof, selected based on rules) with the temporary label assigned (implicitly or explicitly) by fuzzy rules-based labeler 110 for verification.

Based on user interaction with verification interface 117, verification interface 117 receives an input indicating that the user agrees with the temporary label assigned by fuzzy rules-based labeler 110 or an indication that another label is to be assigned to the text segment. If the user verifies the label assigned by the fuzzy rules-based labeler 110—that is, if the input indicates agreement with the temporary label—then ML model training system 102 sets the temporary label assigned by fuzzy rules-based labeler 110 as a training label and adds the labeled text segment 126 to the initial set of labeled training data 122. If the user changes the temporary label for the example—for example, changes the label from "positive" to "negative" or changes the label from "negative" to "positive" for the abstract category—ML model training system 102 sets the new label indicated for the example by the user as the training label for the example and adds the labeled text segment 126 to the labeled training data 122. ML model training system 102 continues to input unlabeled text segments to fuzzy rules-based labeler 110 until a stopping criterion is met, such as a threshold number of labeled examples for each label having been generated.

Thus, fuzzy rules-based labeler 110 processes unlabeled text segments 130 to generate labeled text segments 126, with evaluation and correction of the labels by a human labeler in some embodiments.

In each iteration through a set of iterations, the labeled training data 122 is used to identify potentially high-value unlabeled text segments to label and, in some cases, to identify potentially mislabeled text segments. More particularly, in each iteration through a number iterations, ML model training system 102 combines the labeled training data 122 as augmented with labeled text segments 134 generated in prior iterations, with evaluation and correction by a human labeler in some cases, with a subset of unlabeled text segments 107 (e.g., unlabeled text segments 132 selected for each iteration at random or according to another selection scheme) to create an input dataset that is input into a dimension reduction component 112. According to some embodiments, ML model training system 102 inputs the labeled training data 122 and unlabeled text segments 132 as embedded into numerical representations into a UMAP algorithm or other algorithm for dimension reduction to generate a reduced-dimension data space that comprises reduced-dimension representations of the labeled and unlabeled text segments. The reduced-dimension data space includes data points representing the labeled text segments from the input dataset (labeled data points) and data points representing the unlabeled examples from the input dataset (unlabeled data points).

A manifold (or other reduced-dimension space) can be used to find additional examples— preferably, highly informative examples—to label. For example, the reduced-dimension data space can allow a user or automated process to identify "hard examples" for labeling, such as examples that are close to the decision boundary of a model, unlabeled examples that are in areas with few or no labeled examples, and examples that are likely to be mislabeled (e.g., examples that are in a cluster of examples of a different class).

In some embodiments, ML model training system 102 maps the dataset of labeled and unlabeled training data to a reduced-dimension data space that can be used for visualization of the dataset, such as a 2D or 3D representation of the dataset. ML model training system 102 includes a visualization interface 114 that provides a graphical user interface for viewing the reduced-dimension dataset. In some embodiments, visualization interface 114 provides tools to allow a user to select and label data points from reduced-dimension dataset, thus providing a mechanism for the user to manually select and label items of training data. For example, using the visual representation of the reduced-dimension data space, the user can select graphically high value examples to label, such as labeled examples near or in the middle of a cluster of examples that have a different label, or unlabeled examples that are in areas where there are relatively few (or no) labeled examples.

Figure 8:
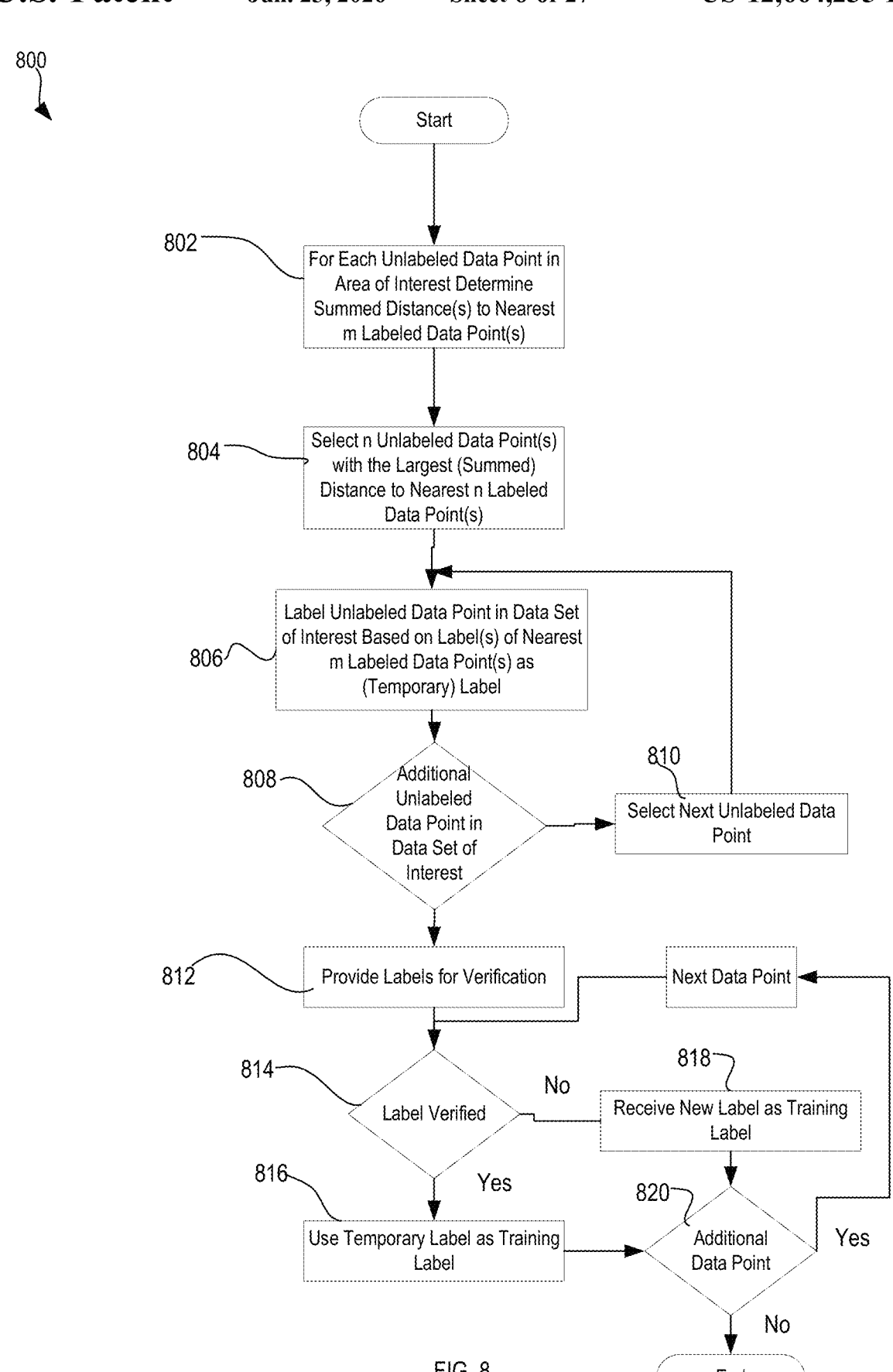
FIG. 8 is a flowchart illustrating another embodiment of a process that uses a reduced-dimension data space for selecting training data to label.
Figure 10:
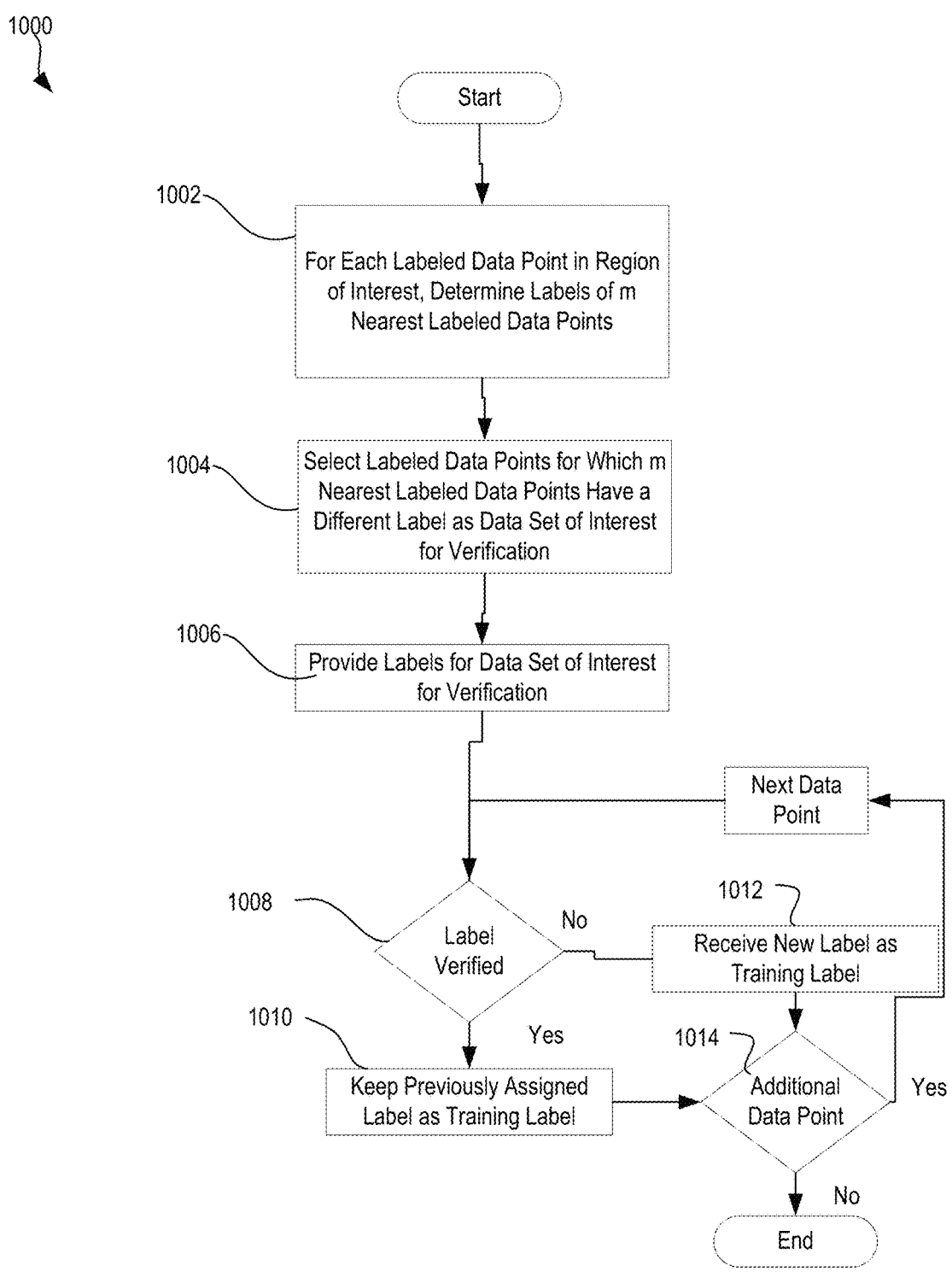
FIG. 10 is a flowchart of one embodiment of a process that uses a reduced-dimension data space to identify potentially mislabeled data points.

In addition to (or instead of) using a reduced-dimension data space for visualization, ML model training system 102 uses a reduced-dimension data space to facilitate automated selection of data points for labeling or verification. In such embodiments, ML model training system 102 includes a selection model 116 trained or otherwise adapted to identify and, in some cases, label data points. By way of example, but not limitation, the selection model 116 may comprise one or more machine learning models, potentially including an ensemble of sub-models, trained to identify high value examples for labeling and to automatically label the examples. In various embodiments, the selection model 116 may implement fast distance/nearest-neighbor calculations to identify examples that are potentially mislabeled or to identify examples in an area that has few (or no) labeled examples. Further, selection model 116 may identify data points that are close to the decision boundaries of selection model 116. FIG. 8 illustrates one embodiment for selecting data points that are in areas that have few or no labeled examples, FIG. 10 illustrates one embodiment for selecting data points that are predicted to have a higher likelihood of being mislabeled, and FIG. 12 and FIG. 14 illustrate embodiments of identifying data points near the decision boundaries of the model. Selection model 116 may apply any number of these techniques or other techniques in any order for selecting or labeling data points.

It can be noted that the selection model 116 may use a reduced-dimension data space that has a different number of dimensions than the data space used for visualization. By way of example, but not limitation, ML model training system 102, in some embodiments, maps the dataset to be evaluated by the selection model 116 to the reduced-dimension data space deemed optimal by the UMAP algorithm for the dataset.

In some embodiments, visualization via visualization interface 114 and evaluation by selection model 116 are both involved in identifying data points for labeling or verification. For example, in addition to (or instead of) providing tools to allow the user to manually select and label data points, visualization interface 114 may provide tools to allow the user to select areas of interest for evaluation by selection model 116. The dataset corresponding to an area of interest selected in the visualization interface 114 is then evaluated by the automated selection model 116 to identify high value data points. As discussed above, in some embodiments, the dataset may be mapped to a different reduced-dimension data space for processing by the selection model 116 than was used for visualization via visualization interface 114. In other embodiments, selection model 116 and visualization interface 114 use data spaces that have the same number of dimensions.

Further, in some embodiments, the visualization step may be omitted. For example, ML model training system 102 may perform dimension reduction on a dataset and input the entire reduced-dimension dataset or algorithmically selected portions of the dataset for evaluation by a selection model 116. In this case, the dataset can be mapped to a reduced-dimension data space used by the selection model, which may not, in some cases, be suitable for visualization, without also mapping the dataset to a reduced-dimension data space suitable for visualization. By way of example, but not limitation, the dataset may be reduced to a space determined to be optimal by the UMAP algorithm, which may not be suitable for visualization in some cases.

In any case, a reduced-dimension data space can be used to identify unlabeled text segments from the set of unlabeled text segments to label. The identified unlabeled text segments are labeled through human labeling, automated labeling by selection model 116, or a combination thereof. The labels assigned by selection model 116 can be considered temporary labels to be verified. Thus, for example, the labeled examples (e.g., labeled text segments 134) labeled by selection model can be provided to verification interface 117 for evaluation and potential correction by a human labeler. Further, the reduced-dimension data space can be used to identify labeled data points that may be mislabeled.

In operation then, ML model training system 102 combines labeled training data 122 with a larger subset of unlabeled text segments 107 (e.g., unlabeled text segments 132 selected at random or selected according to another selection technique) to create an input dataset for dimension reduction. The input dataset is mapped to a reduced-dimension space—for example, a reduced-dimension manifold representation. As mentioned, the manifold (or other reduced-dimension space) can be used to find additional examples—preferably, highly informative examples—to label. For example, the reduced-dimension data space can allow a user or automated process to identify "hard examples" for labeling, such as examples near the decision boundaries of a model, unlabeled examples that are in areas with few or no labeled examples, and labeled examples that are likely to have been mislabeled (e.g., examples that are in a cluster of examples of a different class). In some embodiments, ML model training system 102 applies selection model 116 to generate a relatively small set of additional labeled training data (e.g., labeled text segments 134), which can be evaluated and potentially corrected by a human user, thus augmenting the labeled training data 122 with additional labeled text segments.

ML model training system 102 iterates over mapping the combination of labeled training data 122 (as augmented by prior iterations) and subsets of the unlabeled text segments 107 (set of unlabeled text segments 132 may be different in each iteration) to a reduced-dimension data space, receiving labels from or a user (e.g., via the visualization interface 114) or using selection model 116 to generate additional labeled data, and providing the labeled data for evaluation and possible correction by a user, to generate labeled text segments 136 that are used to train ML classifier 120. In some embodiments, iterations may include training the selection model 116 using the labeled training data 122 (as augmented by prior iterations) and using the trained selection model 116 to generate additional labeled training data for a current iteration.

The iterative process of labeling text segments can continue until a stopping condition is met, such as performing a certain number of iterations, collecting a threshold amount of labeled text segments 136 or satisfying another criterion. The process of generating labeled text segments 136 may be repeated to train ML classifier 120 as needed or desired.

Figure 3:
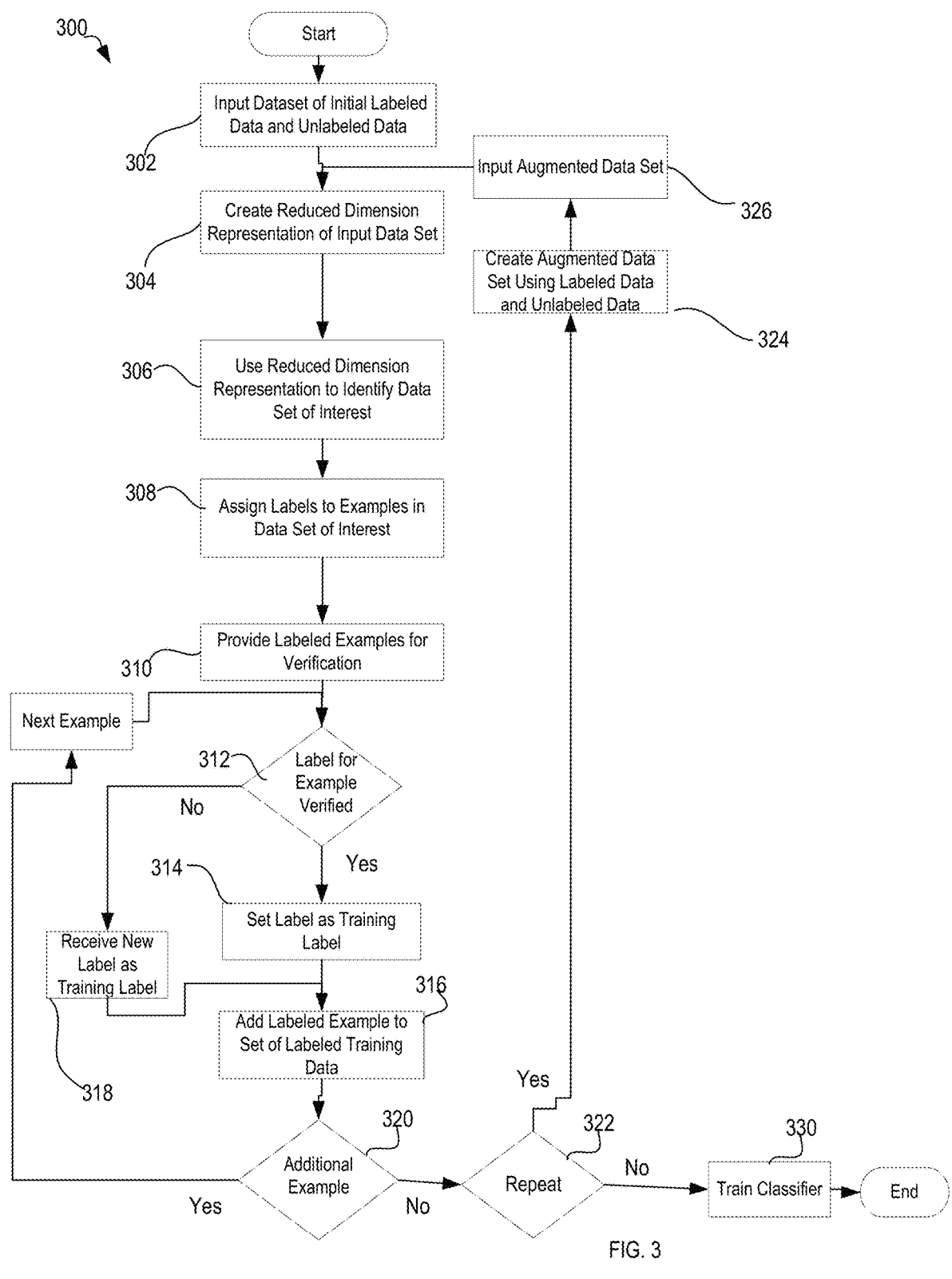
FIG. 3 is a flowchart illustrating one embodiment of a process for labeling training data training an ML classifier.

FIG. 3 is a flowchart illustrating one embodiment of a process 300 for labeling training data and training an ML classifier. Although the following discussion generally uses the example of ML model training system 50 and ML model training system 102, it should be noted that the ML model training systems and the process 300 can be used independently of the other. Process 300 may be embodied as a set of computer-executable instructions stored on a non-transitory, computer-readable medium, or otherwise implemented in an automated fashion with human input in some cases.

A model training system can proceed in an iterative fashion, starting with an input dataset that comprises an initial set of labeled examples and an initial set of unlabeled examples (step 302). For example, ML model training system 50 can proceed in an iterative fashion starting with an initial set of labeled training data 52 and a subset of unlabeled training data 54. As another example, ML model training system 102 can proceed in an iterative fashion starting with an initial set of unlabeled text segments 132 and an initial set of labeled training data 122 comprising seed phrases 124 and labeled text segments 126. The initial set of labeled training data may be generated in a number of ways, including in an iterative fashion.

As will be appreciated, the labeled and unlabeled examples in the input dataset may be embedded as feature vectors or other data structures that have a large number of dimensions. To facilitate identifying target examples—that is, examples of interest for labeling or verification, process 300 includes mapping the examples to a reduced-dimension space (step 304). For example, ML model training system 50 maps labeled training data 52 and a subset of unlabeled training data 54 to a reduced-dimension space. As another example, dimension reduction component 112 maps the input dataset comprising labeled training data 122 and a set of unlabeled text segments 132 to a reduced-dimension representation of the training data. According to some embodiments, UMAP is used to generate a reduced-dimension data space that comprises reduced-dimension representations of the labeled and unlabeled examples. The reduced-dimension data space may comprise, for example, labeled data points representing the labeled examples in the input dataset (for example, data points representing the seed phrases 124, the labeled text segments 126 and any other labeled text segments input in the current iteration) and unlabeled data points representing the unlabeled examples in the input dataset (for example, data points representing the unlabeled text segments 132 input in the current iteration).

The reduced-dimension representation of the dataset may be used to identify target examples to label or for verification. More particularly, the reduced-dimension representation of the dataset is used to identify target data points where the data points represent the training examples of interest for labeling or verification (step 306). Labels are assigned to the target examples. For example, labels are assigned to the data points representing the target examples (step 308). Labels may be assigned to the target data points by a user indicating the labels to be assigned to the target examples, automatically assigning labels to the target data points or corresponding examples (e.g., using a selection model), or a combination thereof.

In some embodiments, a reduced-dimension representation of a dataset is provided to a visualization interface (e.g., visualization interface 72, 114) to enable manual selection and labeling of target data points of interest. In addition (or instead) of using a reduced-dimension representation of a dataset to enable manual selection, some embodiments evaluate reduced-dimension representation of a dataset using an automated selection model (e.g., selection model 116) to identify and, in some cases, label target data points of interest. Some non-limiting example embodiments of using a reduced-dimension representation of an input dataset to identify target data points of interest and assigning labels to the target data points are discussed in conjunction with FIG. 4-FIG. 15C below.

In some embodiments, the labels assigned to the target examples in the dataset of interest at step 308 are considered temporary labels that require verification. In such embodiments, the labeled examples are provided to a user for verification (step 310). For example, ML model training system 50 can route labeled examples to verification interface 62 for verification. As another example, ML model training system 102 can route the labeled text segments 134 to verification interface 117 for verification.

At step 312, the ML model training system determines if a label assigned to a target example is verified. If so, the label is set as the training label for the example (step 314) and the labeled example is added to a set of labeled examples to be used for subsequent iterations or training of an ML classifier (step 316). If the label is not verified, as determined at step 312, the ML model training system receives a new label as the training label for the example (step 318) and adds the example, labeled with the new label, to the set of labeled training data (step 316).

For example, a verification interface (e.g., verification interface 62, verification interface 117 or other verification interface) can present each example labeled by a selection model to a user for verification (step 310). More particularly, in some embodiments, the verification interface queries the user as to whether the labels assigned by the selection model are correct. The verification interface receives an input (e.g., based on user interaction with the verification interface) indicating that the user agrees with the label assigned to the example or indicating that another label is to be assigned to the example. Thus, a model training system can determine if a label is verified (step 312). If the user verifies the label— that is, if the input indicates agreement with the assigned label—then model training system sets the assigned label as a training label (step 314) and adds the labeled example to a set of labeled training data to be used for training the ML classifier (step 316). If the user changes the label for the example—for example, changes the label from "positive" to "negative"—the model training system sets the new label indicated for the example by the user as the training label for the example (step 318) and adds the labeled example the set of labeled training data (step 316). In the embodiment illustrated, steps 310-318 can be repeated for each example in the dataset of interest (e.g., as determined at step 320).

If a stopping condition has not been met (e.g., as determined at step 322), the model training system creates an input dataset for the next iteration (step 324) and uses the augmented dataset as the input dataset for the next iteration (step 326). The input dataset of the next iteration can comprise, for example, the set of labeled examples used as input to the current iteration, as augmented by the labeled examples generated from the current iteration, and a set of unlabeled examples. For example, ML model training system 50 augments labeled training data 52 with the additional labeled examples generated by model training system, with human evaluation and correction in some cases, and uses the labeled training data 52 as augmented and a new subset of unlabeled training data 54 as the input dataset for the next iteration. As another example, ML model training system 102 augments labeled training data 122 with labeled text segments 134 generated by the current iteration, with human evaluation and correction in some cases, and use the augmented labeled training data 122 and a new set of unlabeled text segments 132 as the input dataset for the next iteration. Thus, for example, the input dataset for a next iteration includes the seed phrases 124, the labeled text segments 126 generated by fuzzy rules-based labeler 110, the labeled text segments 134 generated in the current iteration and prior iterations (as verified or corrected by a user in some embodiments), and a new set of unlabeled text segments 132. In some embodiments, the unlabeled examples used for each iteration are selected at random.

The iterative process of labeling data can continue until a stopping condition is met. When the stopping condition is met (e.g., as determined at step 322), the model training system can output a final set of labeled data, which includes labeled examples generated through the iterative process. The final set of labeled data can be input to ML model training component 118, such as an ML training algorithm, for use in training an ML classifier (step 330). The process can be repeated any number of times to train an ML classifier using multiple batches of final labeled data (for example, multiple batches of labeled training data 56, multiple batches of labeled text segments 136).

FIG. 3 is provided by way of example and not limitation. Various steps may be repeated, steps may be performed in different orders, steps omitted, and additional or alternative steps performed.

Figure 4:
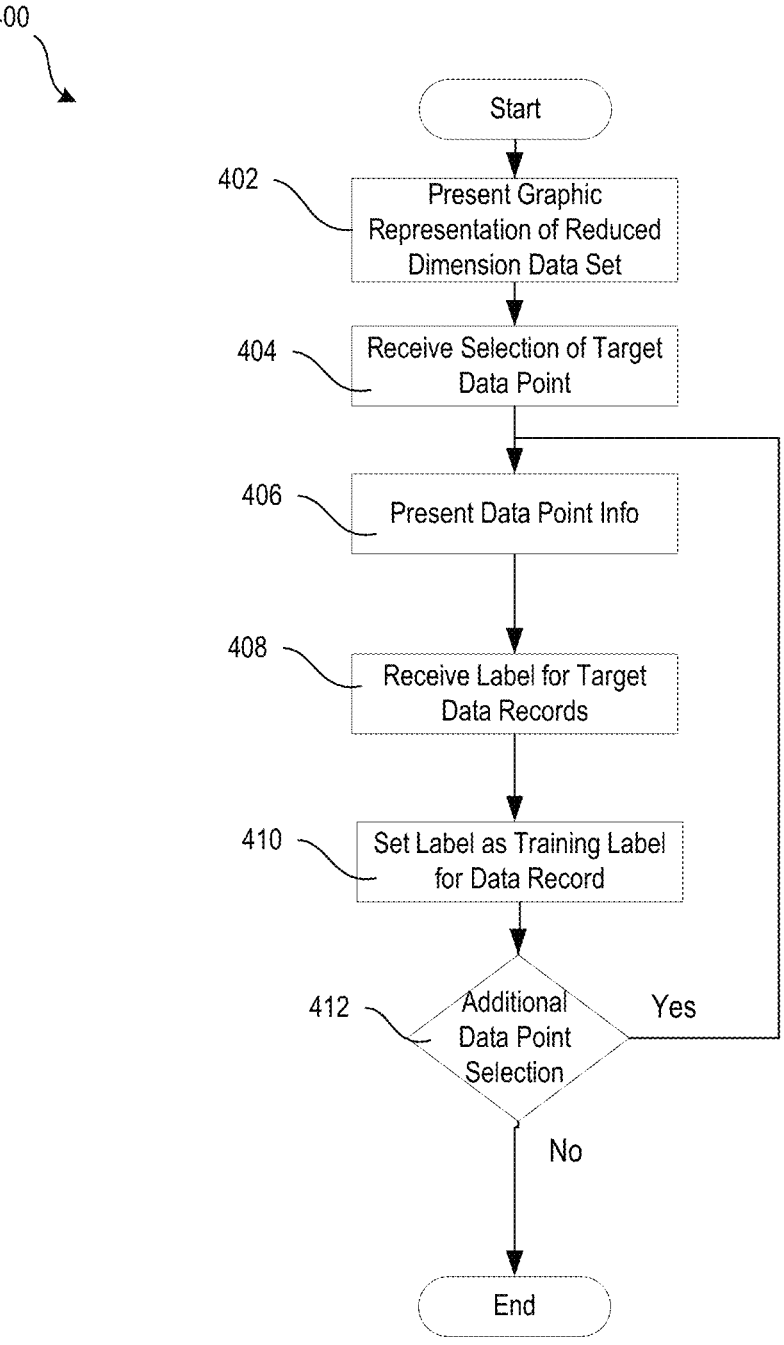
FIG. 4 is a flowchart of illustrating one embodiment of a process for labeling training data using a reduced-dimension representation of a dataset.

FIG. 4 is a flowchart illustrating one embodiment of a process 400 for labeling training data using a reduced-dimension representation. In the example of FIG. 4, the reduced-dimension data space is used to facilitate human selection and labeling of data points via a graphical user interface. Although the following discussion generally discusses process 400 using the examples of ML model training system 50 and ML model training system 102, it should be noted that ML model training systems and process 400 can be used independently of each other. Process 400 may be embodied as a set of computer-executable instructions stored on a non-transitory, computer-readable medium, or otherwise implemented in an automated fashion with human input in some cases.

According to some embodiments of using a reduced-dimension representation of an input dataset to identify a dataset of interest, a graphical representation of the reduced-dimension representation of a dataset is provided to a user (step 402). As discussed above, UMAP or other dimension reduction techniques can be used to map labeled and unlabeled examples to a reduced-dimension space. In some embodiments, the examples are mapped to a 2D space or a 3D space, which can be presented to a user. Accordingly, a graphical user interface can be provided that includes a visual representation of a reduced-dimension dataset. For example, a model training system can include a visualization interface—such as, visualization interface 72, visualization interface 114 or another visualization interface—that provides a graphical user interface for visualizing a reduced-dimension representation of a dataset.

Figure 5:
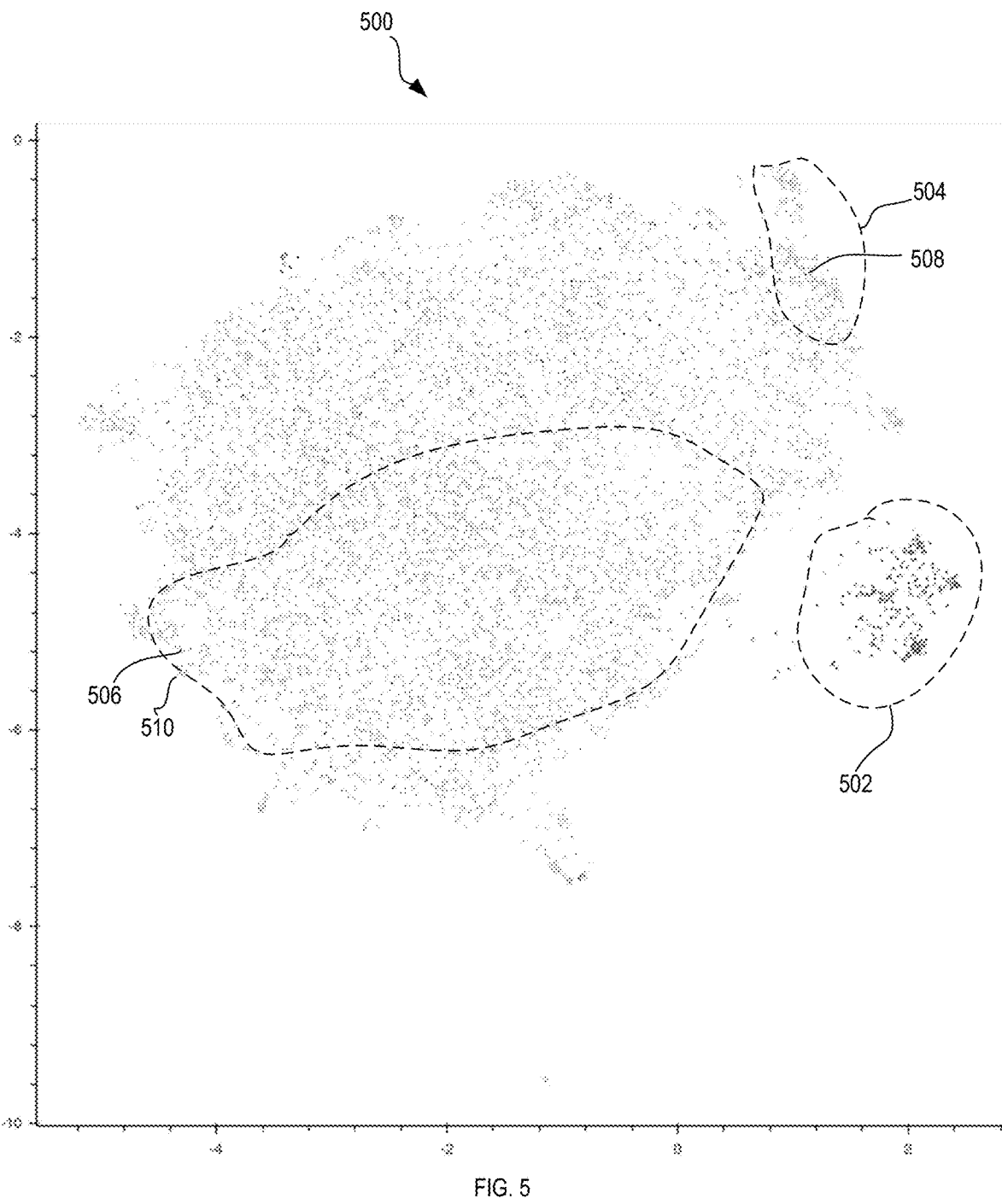
FIG. 5 is a diagrammatic representation of a 2D representation of a dataset.

Turning briefly to FIG. 5, an example of a 2D representation 500 of a dataset is provided. In this embodiment, each labeled example and unlabeled example from an input dataset is represented by a data point in 2D space. Positive examples (examples that are labeled as positive for the category) are represented by dots of one color, negative examples represented by dots of a second color, and unlabeled examples are represented by dots of a third color. Here, area 502 includes mostly positive examples with few unlabeled and negative examples, area 504 includes mostly negative examples with few unlabeled and positive examples, and area 506 includes mostly unlabeled examples with few positive and negative examples, with other areas have different mixes of positive, negative and unlabeled examples.

Figure 6:
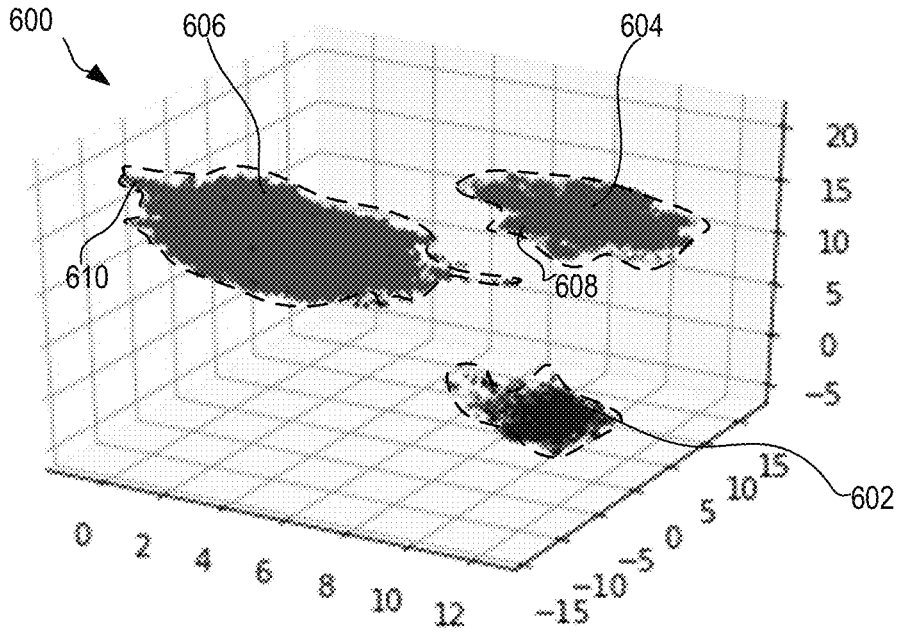
FIG. 6 is a diagrammatic representation of a 3D representation of a dataset.

FIG. 6 is an example of a 3D representation 600 of a dataset. In this embodiment, each labeled example and unlabeled example from an input dataset is represented by a data point in 2D space. Positive examples (examples that are labeled as positive for the category) are represented by dots of one color, negative examples represented by dots of a second color, and unlabeled examples are represented by dots of a third color. Here, cluster 602 includes mostly positive examples with few unlabeled and negative examples, cluster 604 includes mostly negative examples with few unlabeled and positive examples, and cluster 606 includes mostly unlabeled examples with few labeled examples.

A visualization interface (e.g., visualization interface 72, visualization interface 114, or other visualization interface) can include tools to allow a user to select a data point from the graphical representation of the reduced-dimension dataset. Thus, a selection of a target data point can be received (step 404). Based on the selection of a data point, the user is presented with the text segment (or other data item) represented by the data point (step 406) and provided with the option to label the data point. This may include providing a tool to allow the user to verify a label if the user selects a labeled data point from the graphical representation. Thus, a label for a selected data point and hence label for an example can be received based on user interaction with the visualization interface (step 408). For example, ML model training system 50 can receive a label for an example represented by a data point displayed in visualization interface 72 or ML model training system 102 can receive a label for a text segment represented by a data point displayed in visualization interface 114. The received label is set as the training label for the example (step 410). As indicated at step 412, the process of a user selecting and providing labels for examples using the graphic user interface can be repeated for any number of data points.

The visual representation of the reduced-dimension dataset allows the user to easily identify high value examples to label, such as those near or in the middle of a cluster of examples that have a different label, or those that are in areas where there are relatively few (or no) labeled examples. For example, the user may easily identify data point 508 (FIG. 5) or data point 608 (FIG. 6) as a potentially high value data point because data point 508 represents a positive labeled data in cluster 504 of primarily negative labeled data points, and data point 608 is a positive labeled data point in cluster 604 of negative labeled data points. Further, the user may easily identify data point 510 (FIG. 5) or data point 610 (FIG. 6) as a potentially high value data point because each represents an unlabeled example that is in an area with few labeled examples.

Thus, the reduced-dimension representation can be used to enable the user to manually select and label unlabeled examples and to manually select and verify or correct previously labeled examples. It can be noted that some embodiments treat manually entered labels as training labels that do not require verification. In other embodiments, labels input at step 408 may be treated as training labels that require verification. For example, labels input by one user may be routed to another user for verification in some embodiments.

FIG. 4 is provided by way of example and not limitation. Various steps may be repeated, steps may be performed in different orders, steps omitted, and additional or alternative steps performed.

Figure 7:
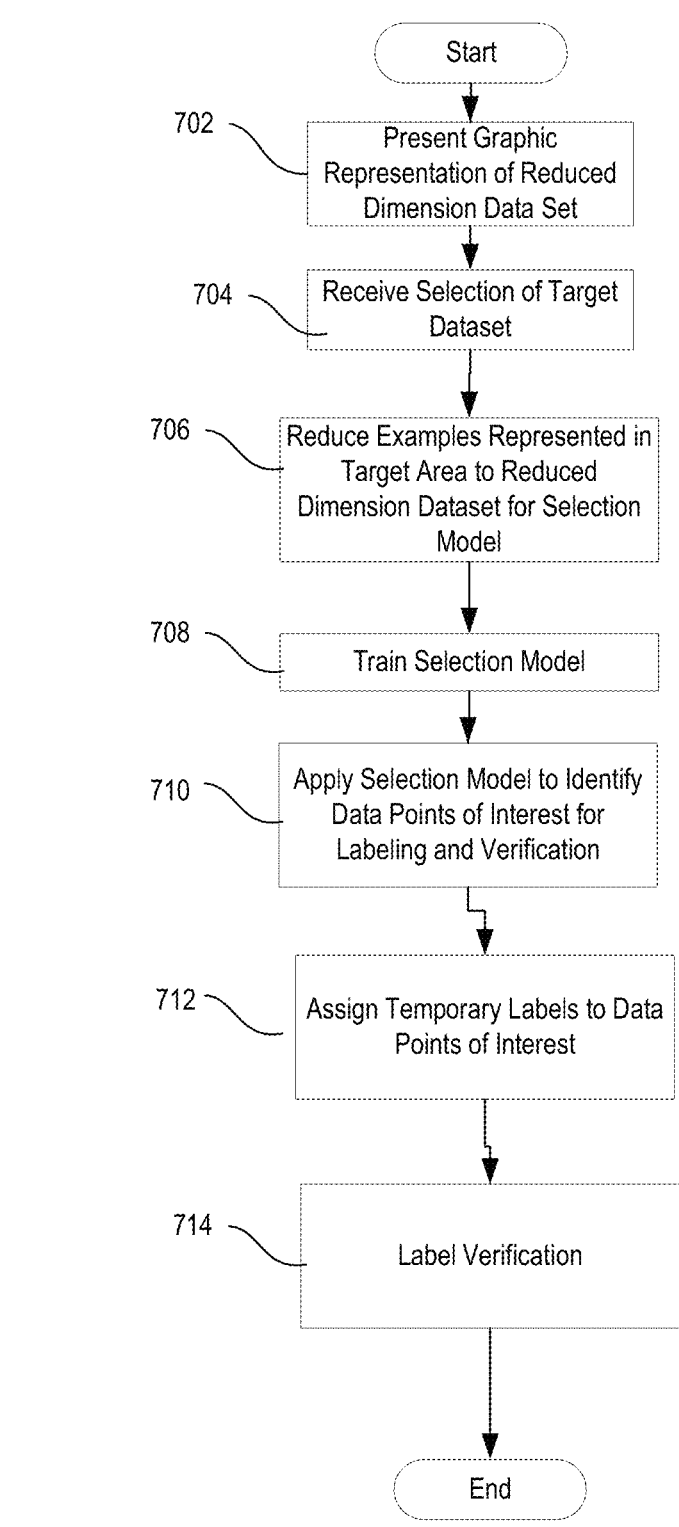
FIG. 7 is a flowchart illustrating one embodiment of a process that uses a reduced-dimension data space for selecting training data to label.

FIG. 7 is a flowchart illustrating one embodiment of a process 700 for labeling training data using a reduced-dimension data space. Although the following discussion generally discusses process 700 using the example of ML model training system 50 and ML model training system 102, it should be noted that the ML model training systems and process 700 can be used independently of each other. Process 700 may be embodied as a set of computer-executable instructions stored on a non-transitory, computer-readable medium, or otherwise implemented in an automated fashion, potentially with human input.

As discussed above, a graphical representation of a reduced-dimension dataset can be provided to a user (step 702). For example, a model training system can include a visualization interface—such as, visualization interface 72, visualization interface 114 or another visualization interface—that provides tools for visualizing labeled and unlabeled examples.

According to some embodiments, a selection of a target dataset for evaluation is received based on the visual representation of the reduced-dimension dataset (step 704). For example, a visualization interface, such as visualization interface 72, visualization interface 114, or another visualization interface, may provide tools to allow the user to select regions of interest or otherwise select data for further evaluation by a selection model. As an even more particular example, the visualization interface 114 can provide a drawing tool that allows the user to define a bounding box (2D or 3D) or other shape to identify a region of interest or otherwise identify data for further evaluation by selection model 116. Thus, a selection of a target dataset for evaluation by a selection model can be received based on user interaction with a graphical user interface. In other embodiments, the selection of an area of interest or other target dataset is determined algorithmically.

The selection model identifies target data points—that is data points representing examples of interest for labeling or verification—from the area of interest or other target dataset. In some embodiments, the selection model (e.g., selection model 116 of FIG. 2) is trained or otherwise adapted to evaluate data points using a reduced-dimension representation that has a different number of dimensions than the data space used for visualization. In such an embodiment, the examples represented by the data points selected using the 2D or 3D data space (or other reduced-dimension data space) at step 704 are mapped to the reduced-dimension data space used for the selection model (step 706). For example, UMAP or another dimension reduction technique is used to map the examples to a reduced-dimension space supported by the selection model. To provide an example, say a user interacting with a visualization interface selects area 504 (FIG. 5) for evaluation, then the examples represented by the data points in area 504 (e.g., the labeled and unlabeled text segments represented by the data points in area 504) are mapped to the reduced-dimension representation of the selected area for evaluation by the selection model. Thus, the selection model may identify target data points from the area of interest by identifying the target data points using a reduced-dimension representation of the area of interest that has a different number of dimensions than the data space used to select the area of interest. In other embodiments, the selection model 116 uses the same number of dimensions as used for visualization and step 706 may be omitted.

A selection model, such as selection model 116, may include one or more machine learning models, potentially including an ensemble of simple sub-models. Preferably, the machine learning model(s) of the selection model are simpler than the final ML classifier ultimately being trained using the training data. For example, selection model 116 preferably includes models that are simpler than ML classifier 120. Some embodiments include training the selection model (step 708). For example, previously labeled examples can be used to train the selection model 116 prior to applying the selection model 116 to a dataset in a current iteration. In addition (or instead of) using models that require training, some embodiments use relatively simple machine learning models that do not require training prior to being applied.

A selection model (e.g., selection model 116) is applied to the set of examples selected via the visualization interface at step 704 to identify target examples of interest for labeling or verification (step 710). In some embodiments, the selection model assigns temporary labels to the target examples of interest (step 712). The temporary labels are provided to a user for verification (step 714) (see, e.g., steps 310-320 of FIG. 3 for example). Some non-limiting examples of identifying target examples of interest, labeling the target examples, and verification of assigned labels are discussed below.

FIG. 7 is provided by way of example and not limitation. Various steps may be repeated, steps may be performed in different orders, steps omitted, and additional or alternative steps performed.

FIG. 8 is a flowchart illustrating one embodiment of a process 800 for selecting unlabeled examples that are in areas with no or few or no labeled examples. Although the following discussion generally discusses process 800 using the example of ML model training system 50 and ML model training system 102, it should be noted that the ML model training systems and process 800 can be used independently of each other. Process 800 may be embodied as a set of computer-executable instructions stored on a non-transitory, computer-readable medium, or otherwise implemented in an automated fashion, potentially with human input.

According to the embodiment of FIG. 8, a selection model, such as selection model 116, identifies examples of interest for labeling and verification by using a reduced-dimension space to identify unlabeled data points that are in areas with no, or few, labeled data points. For the sake of example, the selection model is applied to a relatively small set of data points, for example based on a region selected by a user at step 704 of FIG. 7. However, it will be appreciated that process 800 may also be applied to an automatically selected region, or to a dataset that represents all the examples in the input dataset (e.g., the entire dataset input at steps 302, 326), or to another target dataset.

The selection model evaluates each unlabeled data point in a reduced-dimension dataset (for example, the reduced-dimension dataset corresponding to the area of interest selected via a visualization interface) to determine the distance from the unlabeled data point to the nearest m labeled data points and, if m>1, sums the distances (step 802). In some embodiments, m is selected to be larger than the number of dimensions of the reduced-dimension dataset used by the selection model. The selection model selects, as the target data points, the n data points having the n longest distances (summed distances if m>1) to the nearest labeled data points as the dataset of interest. Further, the data model labels a selected unlabeled data point based on the labels of the nearest m labeled data points to the selected unlabeled data point (step 806).

Figure 9A:
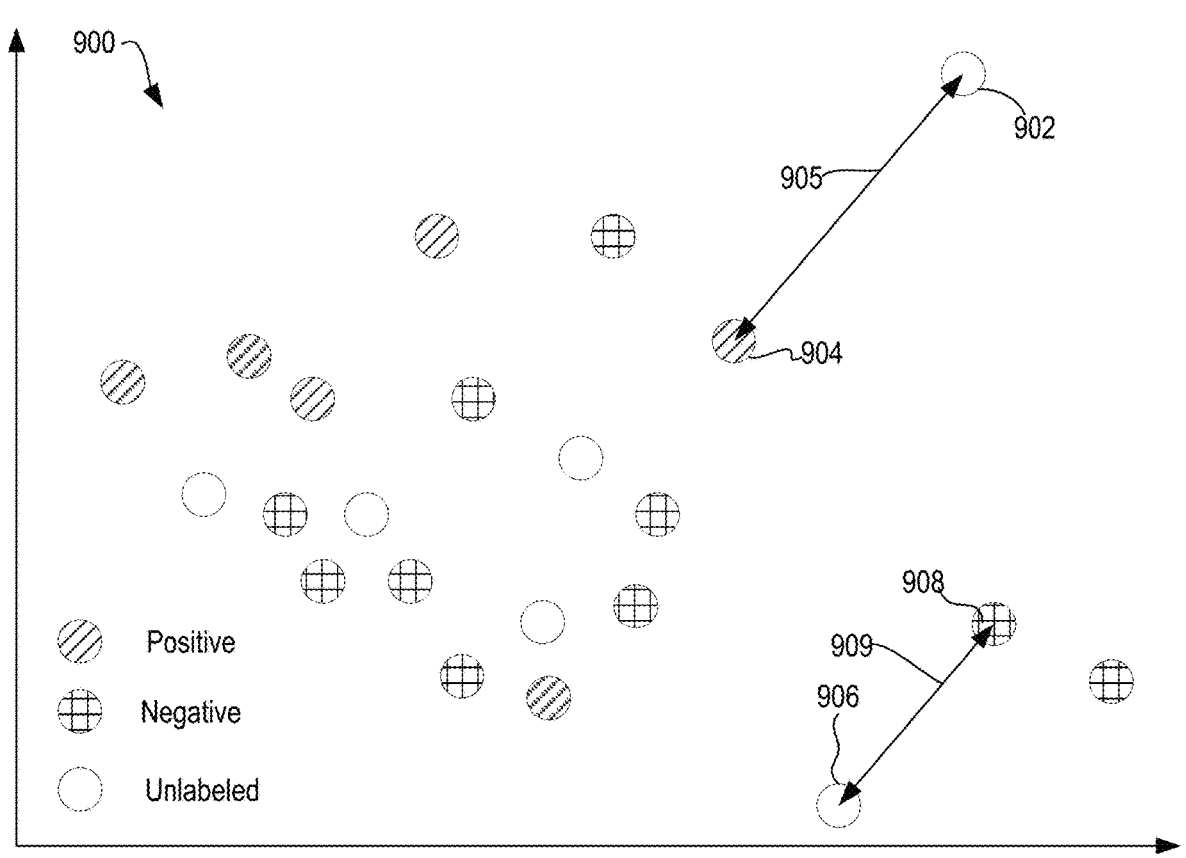
FIG. 9A, FIG. 9B, FIG. 9C, FIG. 9D, and FIG. 9E are diagrammatic representations of embodiments of using a reduced-dimension data space to identify unlabeled training data to label and labeling the unlabeled training data.

Turning briefly to FIG. 9A, this figure depicts a portion of a reduced-dimension data space 900 that includes a set of data points, each data point representing a labeled example (e.g., a labeled text segment) or an unlabeled example (e.g., an unlabeled text segment). In the example of FIG. 9A, m=1 and n=2. The selection model evaluates each unlabeled data point in the set of unlabeled data points and determines the distance from each unlabeled data point to the labeled data points, and more particularly to at least the nearest labeled data point. For example, the selection model determines the distance 905 from data point 902 to data point 904, the distance 909 from data point 906 to data point 908, and so on. The selection model identifies target examples for labeling by identifying the data points with the n longest distances to a nearest labeled data point as a dataset of interest for labeling and verification (step 804). For example, if n=2 (e.g., based on configuration), the selection model selects the examples represented by unlabeled data point 902 and unlabeled data point 906 as the dataset of interest for labeling and verification because, of the unlabeled data points in data space 900, data point 902 has the longest distance 905 to the nearest labeled data (data point 904) and unlabeled data point 906 has the second longest distance 909 to the nearest labeled data point (data point 908).

The selection model labels each unlabeled data point for the dataset of interest with the label of the nearest labeled data point as a temporary label (step 806). For example, with reference to FIG. 9B, the selection model assigns the temporary label "positive" to unlabeled data point 902 based on the nearest labeled data point 904 and assigns the temporary label "negative" to unlabeled data point 906 based on the label of labeled data point 908. Labeling a data point may include labeling the data point in the reduced-dimension space, labeling the example represented by the data point, or otherwise assigning the label to the item of training data that the data point represents.

Figure 9B:
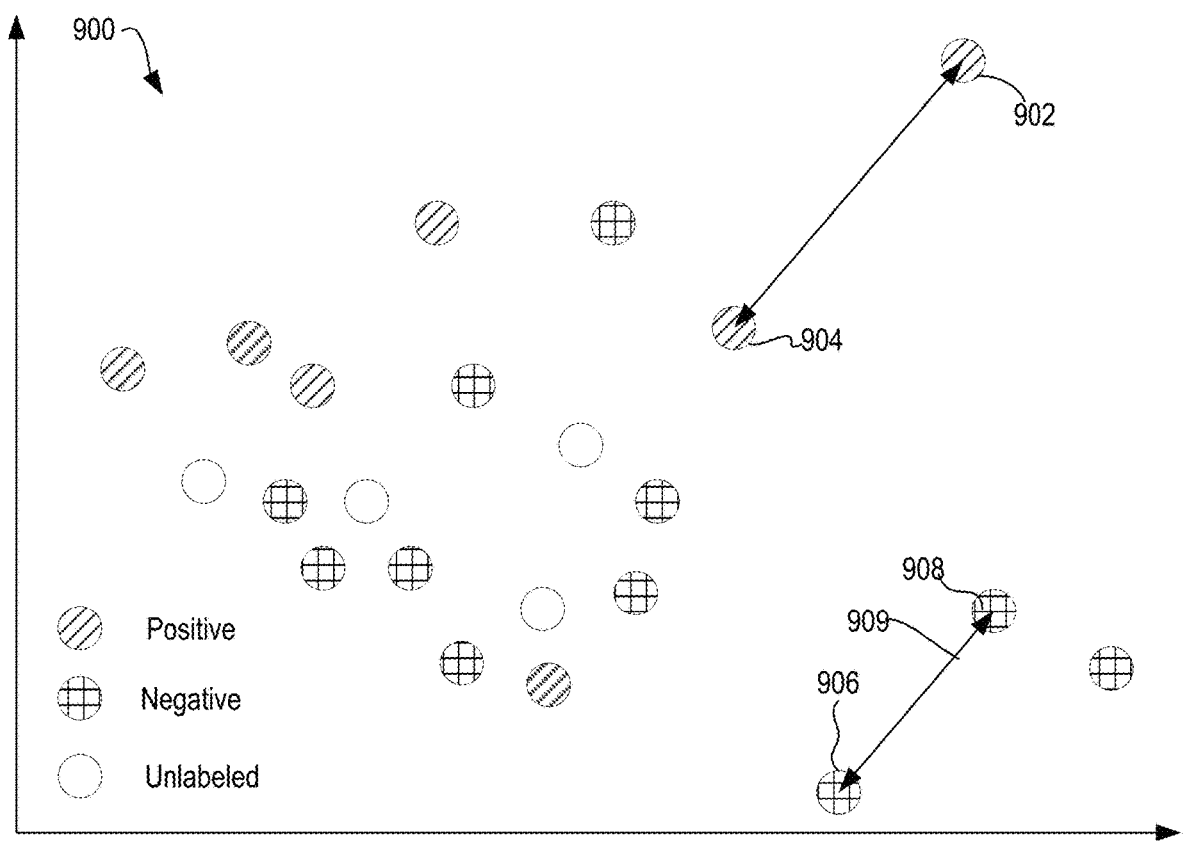

Step 806 can be repeated for each unlabeled example in the dataset of interest (as represented at step 808 and step 810). As depicted in FIG. 9B then, which represents data space 900, wherein previously unlabeled data points are labeled, data point 902 and data point 906 are labeled accordingly with temporary labels.

Figure 9C:
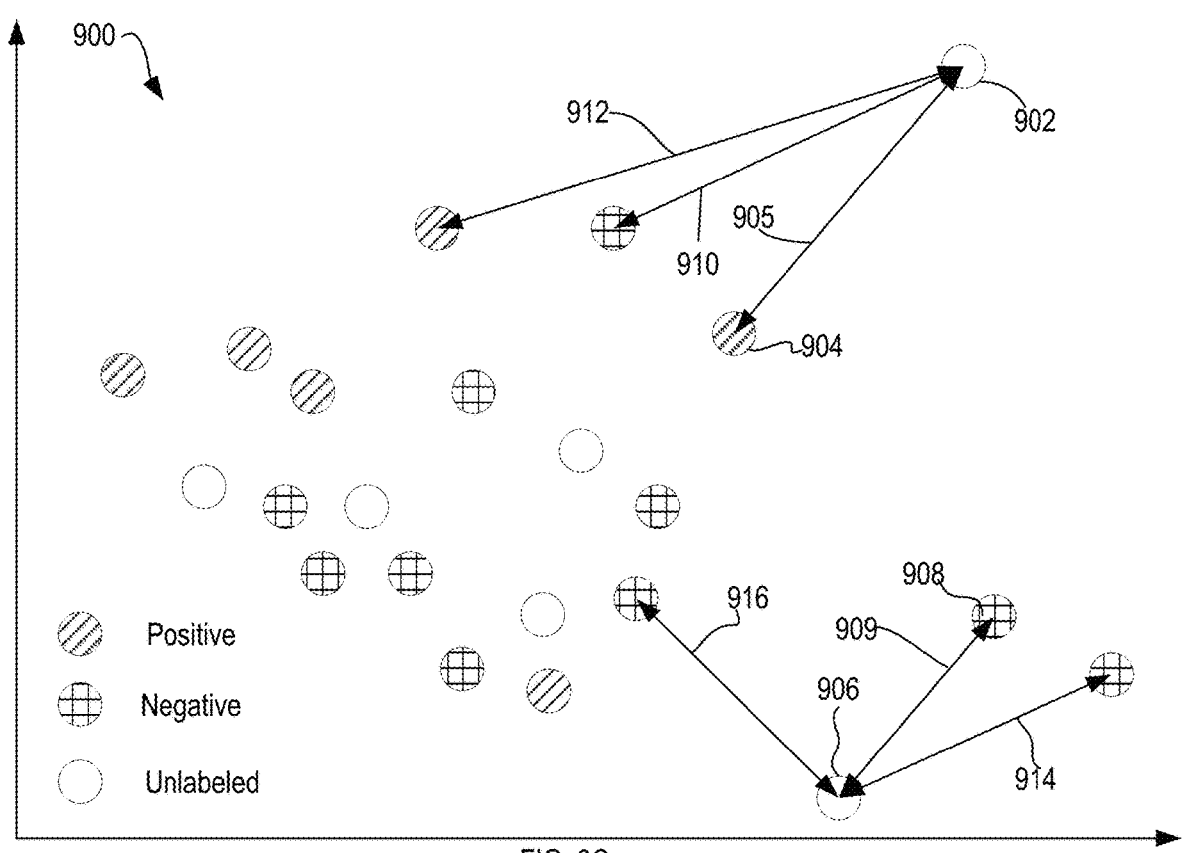
Figure 9D:
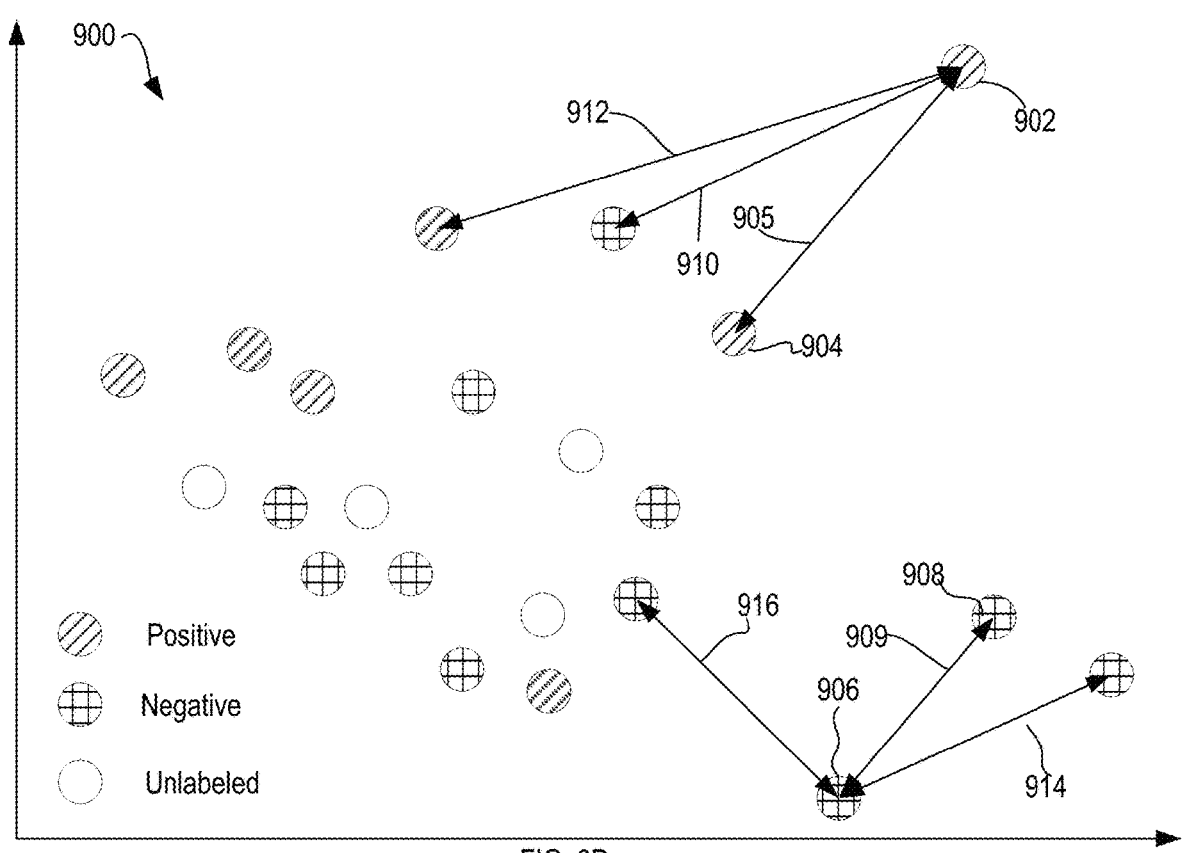

FIG. 9C provides another example in which m=3 and n=2. Here, the selection model determines the distance from each unlabeled data point to the three nearest labeled data points and sums the distances of each unlabeled data point in dataset 900 to the three nearest data points (step 802). For example, the selection model sums distances 905, 910 and 912 for data point 902, sums distances 909, 914, 916 for data point 906 and so on. The selection model identifies target examples for labeling by identifying the data points with the n largest summed distances to the m nearest labeled data points as a dataset of interest (step 804). For example, if n=2 (e.g., based on configuration), the selection model identifies data point 902 and unlabeled data point 906 as the target data points for labeling and verification because, of the unlabeled data points in data space 900, data point 902 has the largest 905 summed distance to the three nearest unlabeled data points and unlabeled data point 906 has the second largest summed distance to the three nearest labeled data points.

In the foregoing example, the selection model selects the n most distance (e.g., based on summed distances if m>1) unlabeled data points to label. Selection rules implementing other sampling techniques known or developed in the art can be used. By way of example, but not limitation, some embodiments may select all the data points having a (summed) distance to the nearest labeled m datapoints that is greater than a threshold distance. As another example, a selection model may use weighted sampling in which unlabeled data points with lower distances have a lower probability of being selected. Other selection techniques may also be used.

The selection model labels each unlabeled data point for the dataset of interest based on the labels of the nearest labeled data points as a temporary label (step 806). In some instances, the m nearest labeled data points may have different labels, as is illustrated in the case of data point 902.

Various labeling rules may be applied to select the label to assign to the unlabeled data point.

In some embodiments, the selection model assigns the temporary label based on the majority label of the m nearest data points. For example, with reference to FIG. 9D, the selection model assigns data point 902 a "positive" label because two thirds of the m nearest labeled data points have a "positive" label and assigns data point 906 a "negative" label because all of the m nearest data points have a "negative" label. Various other labeling rules based on the labels of and distances to the m nearest data points or other factors can also be implemented.

As another example of a labeling rule, a selection model assigns the label of the nearest labeled data point in the set of m labeled data points to the unlabeled data point. For example, the selection model assigns the temporary label "positive" to unlabeled data point 902 based on the nearest labeled data point 904 and assigns the temporary label "negative" to unlabeled data point 906 based on the label of labeled data point 908.

As another example of a labeling rule, the selection model performs a weighted distance determination and selects a label based on the weighted distance for each label. More particularly, in some embodiments, the selection model performs an inverse weighted distance calculation for each label and selects the label with the largest weighted distance. For example, when determining the temporary label to assign to data point 902, the selection model performs an inverse weighted distance calculation for the positive label using distances 905, 912 and an inverse weighted distance calculation for the negative label and selects a label based on label with the largest weighted distance for data point 902.

As yet another example of a labeling rule, the selection model assigns a temporary label to an unlabeled data point based on the average distance from the unlabeled data point to the labeled data points having each label from the set of m nearest labeled data points. For example, when determining the temporary label to assign to data point 902, the selection model determines the average of distances 912 and 905 to the positive labeled data points, compares it to the average distance to the negative labeled data points (in this case distance 910 since there is only one negative labeled data point in the set of m nearest data points) and selects the label having the lowest average distance as the temporary label The target examples labeled by the selection model are provided for verification (step 812). For example, ML model training system 50 can route temporarily labeled examples represented by data points 902, 906 to verification interface 62 for verification of the temporary labels. As another example, ML model training system 102 can route labeled text segments 134 represented by data points 902, 906 to verification interface 117.

At step 814, the ML model training system determines if a label assigned to a target example is verified. If so, the temporary label is set as the training label for the example (step 816). If the label is not verified, as determined at step 814, the ML model training system receives a new label for the example and sets the new label as the training label for the example (step 818).

For example, a verification interface (e.g., verification interface 62, verification interface 117 or other verification interface) can present each example labeled by a selection model to a user for verification (step 812). In some embodiments, the verification interface queries the user as to whether the labels assigned by the selection model are correct. The verification interface receives an input (e.g., based on user interaction with the verification interface) indicating that the user agrees with the label assigned to the example or indicating that another label is to be assigned to the example. Thus, a model training system can determine if a label is verified (step 812). If the user verifies the label—that is, if the input indicates agreement with the assigned label—then the model training system sets the assigned label as a training label (step 816). If the user changes the label for the example—for example, changes the label from "positive" to "negative"—the model training system sets the new label indicated for the example by the user as the training label for the example (step 818). The examples with their labels verified or corrected as needed, can be added to the set of labeled examples for further iterations or for training the ML classifier (see, e.g., step 316 of FIG. 3).

Figure 9E:
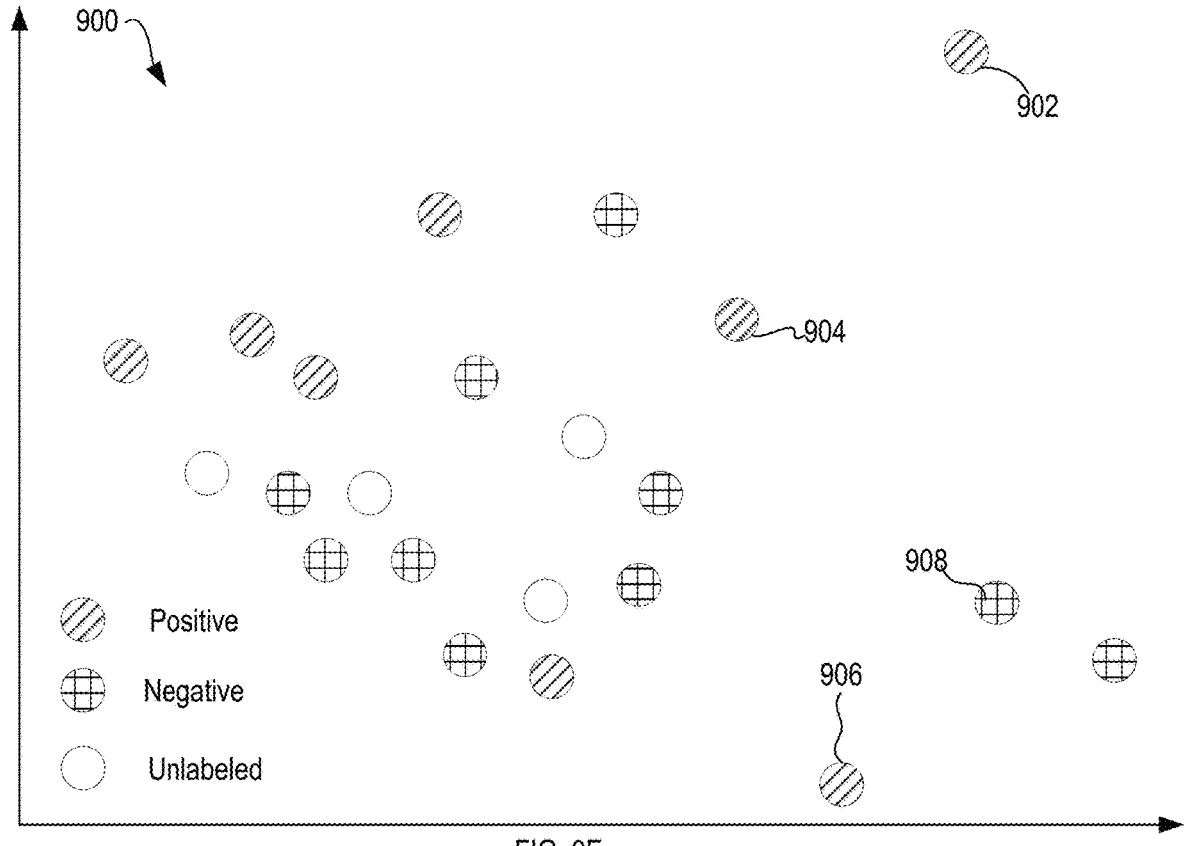

For example, in FIG. 9E a user has verified the "positive" label for data point 902. As such, "positive" is set as the training label for the example represented by data point 902 (step 816). On the other hand, the user has corrected the previously assigned "negative" label for data point 906 to "positive" as indicated in FIG. 9E. The examples represented by data points 902, 906, with their labels verified or corrected as needed, can be added to the set of labeled examples for further iterations or for training the ML classifier. Accordingly, ML model training system 102 sets the training label for the example represented by data point 906 to "positive" (step 818). In the embodiment illustrated, steps 814-818 can be repeated for each example in the dataset of interest (e.g., as determined at step 820).

FIG. 8 is provided by way of example and not limitation. Various steps may be repeated, steps may be performed in different orders, steps omitted, and additional or alternative steps performed.

FIG. 10 is a flowchart illustrating one embodiment of a process 1000 for selecting potentially mislabeled examples using a reduced-dimension data space. Although the following discussion generally discusses process 1000 using the example of ML model training system 50 and ML model training system 102, it should be noted that the model training systems and process 1000 can be used independently of the other. Process 1000 may be embodied as a set of computer-executable instructions stored on a non-transitory, computer-readable medium, or otherwise implemented in an automated fashion, potentially with human input.

According to the embodiment of FIG. 10, a selection model, such as selection model 116, is adapted to evaluate data points in a reduced-dimension space to identify potentially mislabeled data points. For the sake of example, the selection model is applied to a relatively small set of data points, for example based on a region selected by a user at step 704 of FIG. 7. However, it will be appreciated that process 1000 may also be applied to an automatically selected region, to a dataset that represents all the examples in the input dataset or to another target dataset.

The selection model evaluates labeled data points in a reduced-dimension dataset (for example, the reduced-dimension dataset corresponding to the area of interest selected via a visualization interface) to identify target examples for verification. Various selection rules may be applied to select labeled data points for verification. According to some embodiments, the selection model evaluates each labeled data point in the dataset of interest to determine if the m nearest labeled data points have a different label (m may be the same as or different than m in step 802). In some embodiments, m is selected to be larger than the number of dimensions of the reduced-dimension dataset used by the selection model. If the m nearest labeled data points to a particular data point have a different label than that data point, the labeled data point is selected as a target datapoint for verification (step 1004).

Figure 11A:
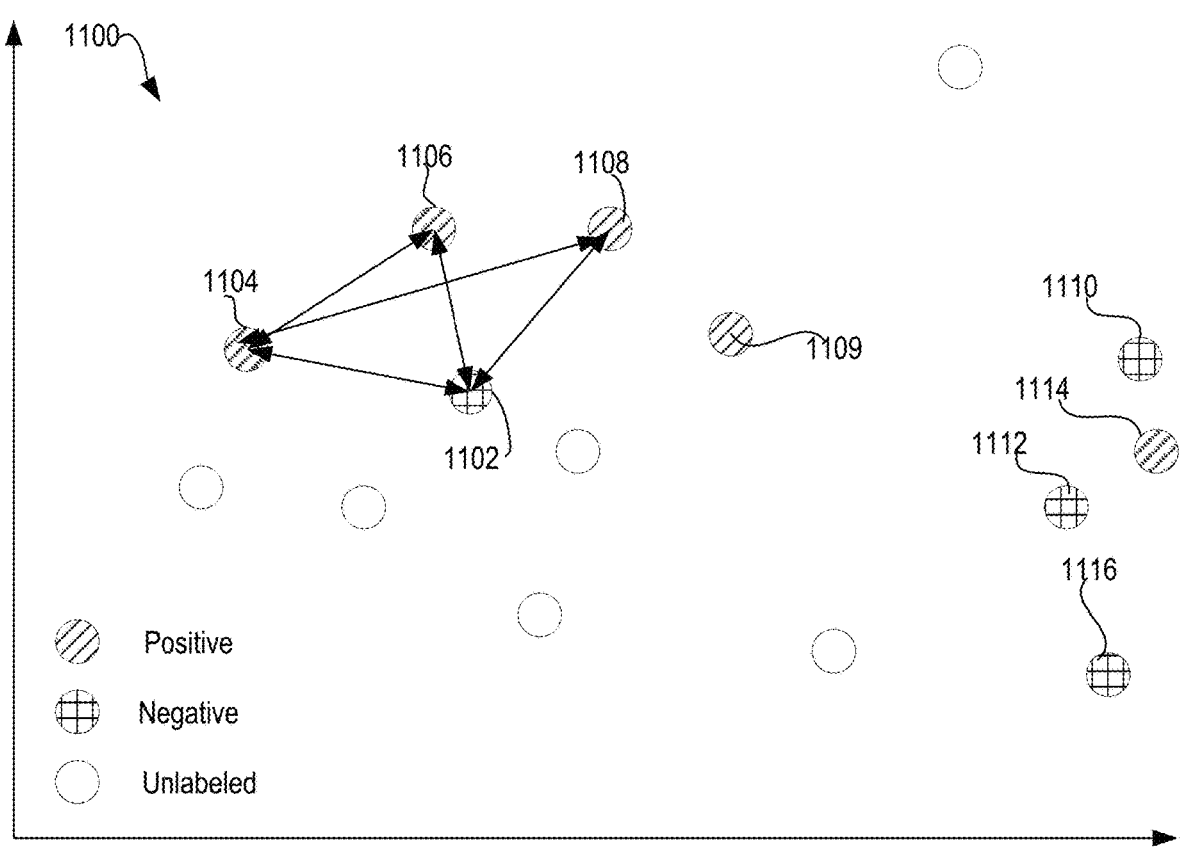
FIG. 11A and FIG. 11B are a diagrammatic representation of one embodiment of using a reduced-dimension data space to identify and correct a mislabeled data point.

Turning briefly to FIG. 11A, this figure depicts a portion of a reduced-dimension data space 1100 that includes a set of data points, each data point representing a labeled example (e.g., a labeled text segment) or an unlabeled example (e.g., an unlabeled text segment). For each labeled data point 1102, 1104, 1106, 1108, 1109, 1110, 1112, 1114, 1116, the selection model determines the distances to other labeled data points and the labels of m data points (step 1002). Using m=3 and data point 1102, selection model 116 determines that the three nearest data points (data point 1104, data point 1106, data point 1108) all have a label of "positive", which is different from the "negative" label assigned to data point 1102. This indicates that data point 1102 is potentially mislabeled. As such, data point 1102 is identified as a target data point for verification. Similarly, for data point 1104, selection model 116 determines that the three nearest labeled data points (data point 1102, data point 1106, data point 1108) have a mix of positive and negative labels. Data point 1104 is not selected as a target data point for verification.

Other selection rules for selecting target data points for verification may be applied. According to one embodiment, the selection model selects a labeled data point for verification if the majority (or some threshold percentage) of the m nearest labeled data points have a different label than the data point. According to another embodiment, the selection model selects a labeled data point for verification based on the weighted distance of the label assigned to the data point and the weighted distance of other labels, using the distances to the labeled data points in the set of m nearest labeled data points. As yet another example, the selection model determines the distances to the nearest m data points having a different label, sums the distances and selects the data points having the n lowest summed distances (n may be different for step 1004 than for step 804).

The examples identified by the selection model are provided for verification (step 1006). For example, ML model training system 50 can route the example represented by data point 1102 to verification interface 62 for verification of the temporary labels. As another example, ML model training system 102 can route a labeled text segment represented by data point 1102 to verification interface 117.

At step 1008, the ML model training system determines if a label assigned to a data point of interest is verified. If so, the previously assigned label is kept as the training label for the example (step 1010). If the label is not verified, as determined at step 1008, the ML model training system receives a new label for the example and sets the new label as the training label for the example (step 1012).

For example, a verification interface (e.g., verification interface 62, verification interface 117 or other verification interface) can present the labeled examples represented by the n data points selected at step 1004 for verification of the labels assigned to the examples. In some embodiments, the verification interface queries the user as to whether the labels assigned to the examples are correct. The verification interface receives an input (e.g., based on user interaction with the verification interface) indicating that the user agrees with the label assigned to the example or indicating that another label is to be assigned to the example. Thus, a model training system can determine if a label is verified (step 1008). If the user verifies the label— that is, if the input indicates agreement with the assigned label—then the model training system keeps the previously assigned label as a training label (step 1010). If the user changes the label for the example—for example, changes the label from "positive" to "negative"—the model training system sets the new label indicated for the example by the user as the training label for the example (step 1014).

Figure 11B:
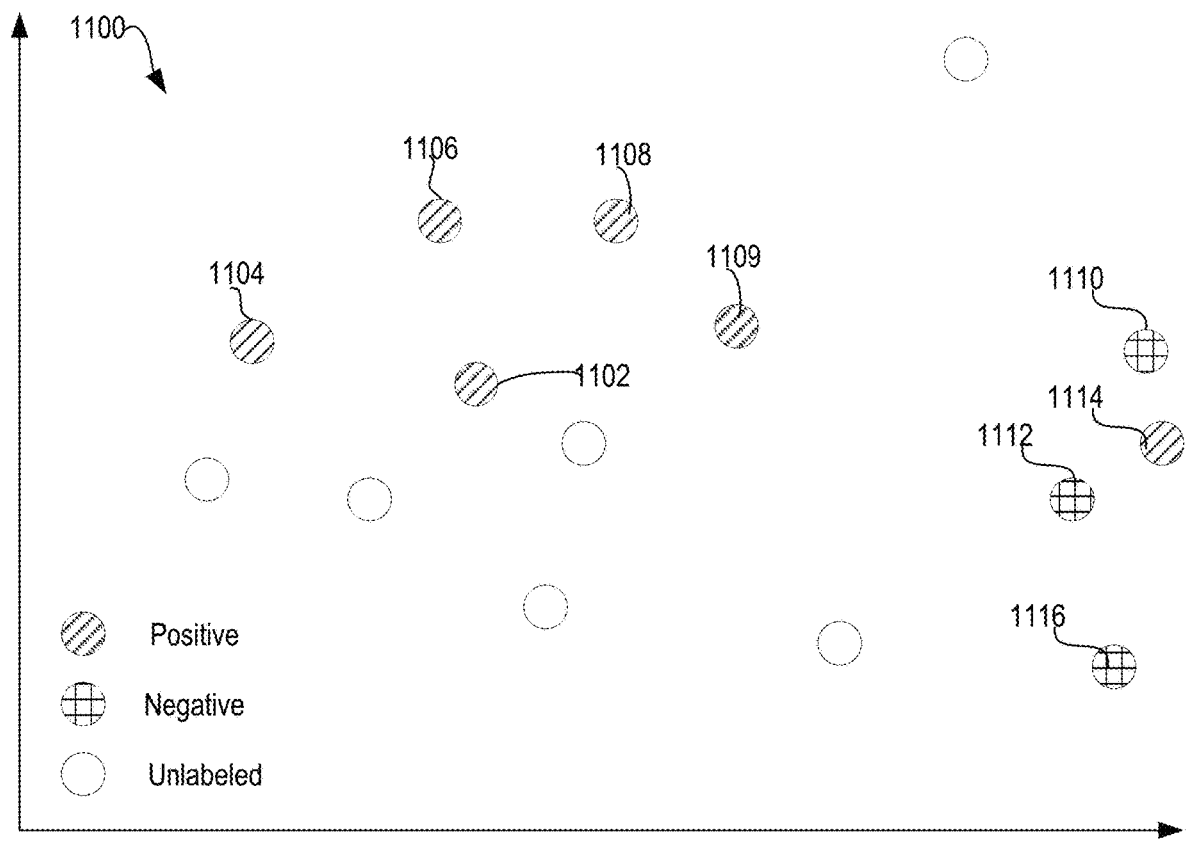

For example, in FIG. 11B a user has changed the "negative" label for data point 1102 to "positive." As such, "positive" is set as the training label for the example represented by data point 1102 (step 1012). In the embodiment illustrated, steps 1008-1014 can be repeated for each example in the dataset of interest (e.g., as determined at step 1004).

FIG. 10 is provided by way of example and not limitation. Various steps may be repeated, steps may be performed in different orders, steps omitted, and additional or alternative steps performed.

FIG. 12 is a flowchart illustrating one embodiment of a process 1200 for selecting and labeling examples using a reduced-dimension data space. Although the following discussion generally discusses process 1200 using the example of ML model training system 50 and ML model training system 102, it should be noted that the ML model training systems and process 1200 can be used independently of each other. Process 1200 may be embodied as a set of computer-executable instructions stored on a non-transitory, computer-readable medium, or otherwise implemented in an automated fashion, potentially with human input.

For the sake of example, the selection model is applied to a relatively small set of data points, for example based on a region selected by a user at step 704 of FIG. 7. However, it will be appreciated that process 1200 may also be applied to an automatically selected region, to a dataset that represents all the examples in the input dataset, or to another target dataset.

According to the embodiment of FIG. 12, a selection model is adapted to classify examples to identify examples with a low confidence classification. In such embodiments, the selection model may comprise a relatively simple classifier that is used to classify reduced-dimension representations of examples. In some embodiments, a relatively simple machine learning model (e.g., a single model or an ensemble of models) that does not require prior training is used. By way of example, but not limitation, a probabilistic classifier, such as a naive bayes or other nearest neighbor classification model that does not require prior training is used.

Figure 13A:
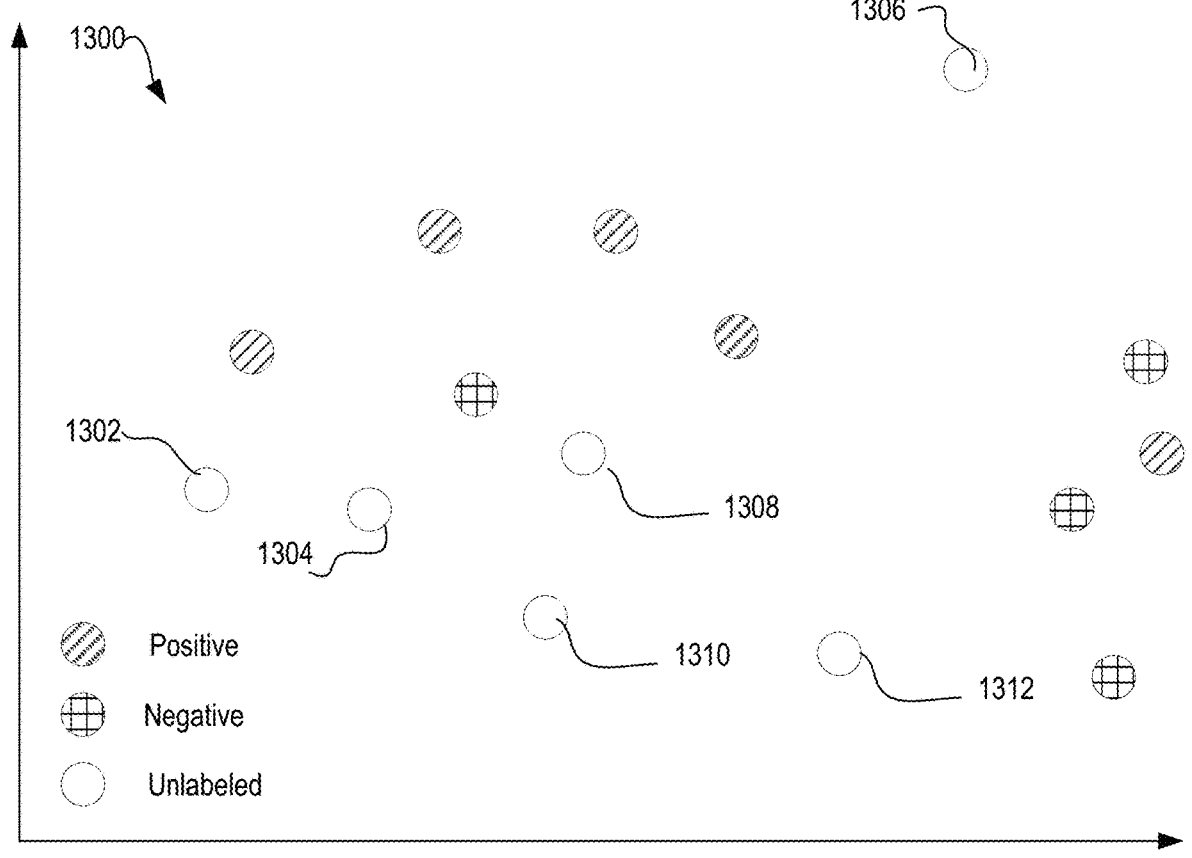
FIG. 13A, FIG. 13B, and FIG. 13C are a diagrammatic representation of one embodiment of using a reduced-dimension data space to identify and label low confidence data points.

The selection model evaluates each unlabeled data point in a reduced-dimension dataset (for example, the reduced-dimension dataset corresponding to the area of interest selected via a visualization interface) to determine a label for each unlabeled data point, including determining a confidence level in the label assigned. As discussed above, some embodiments apply a relatively simple classifier, such as a naive Bayes or a nearest neighbor classifier, to determine the labels and confidences for the unlabeled data points. Turning briefly to FIG. 13A, this figure depicts a portion of a reduced-dimension data space 1300 that includes a set of data points, each data point representing a labeled example (e.g., a labeled text segment) or an unlabeled example (e.g., an unlabeled text segment). The selection model evaluates each unlabeled data point 1302, 1304, 1306, 1308, 1310, 1312 and determines a label for each data point and a confidence in that label.

Figure 13B:
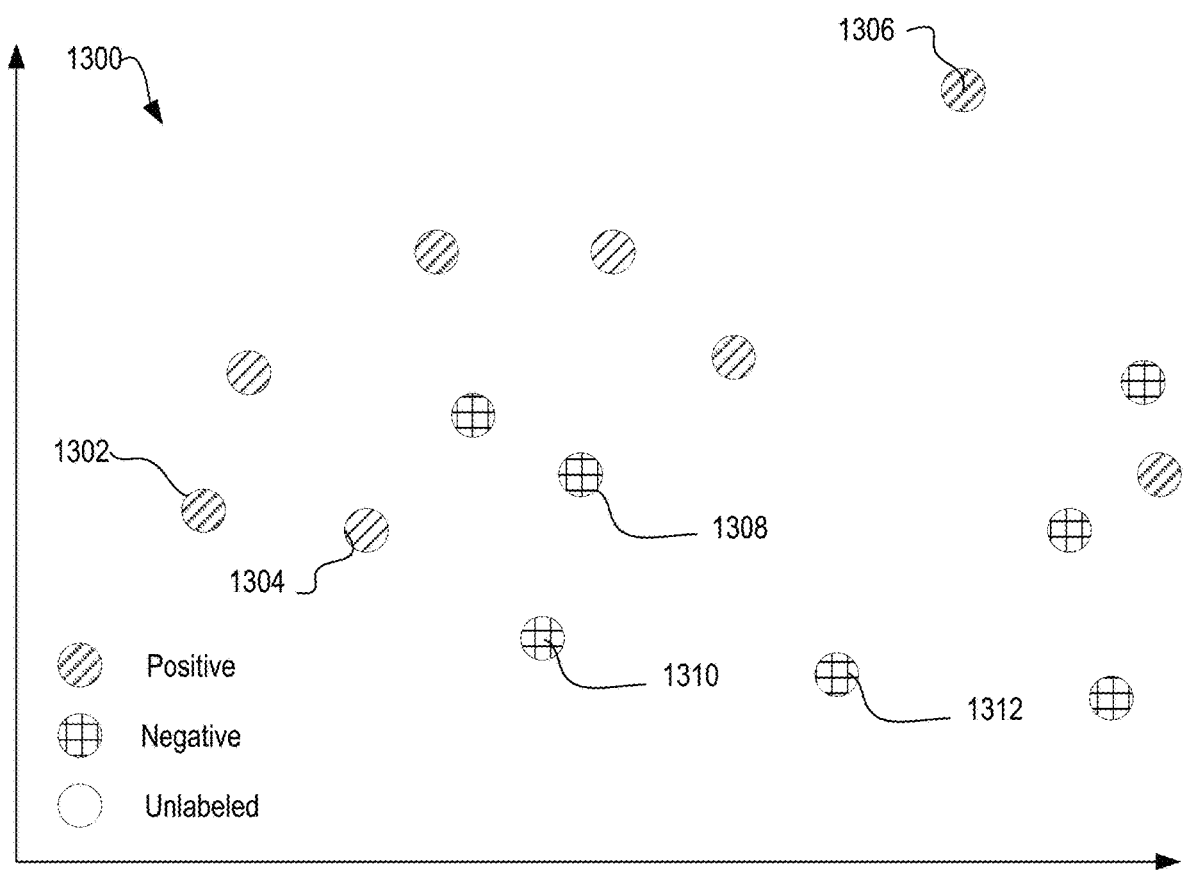
Figure 13C:
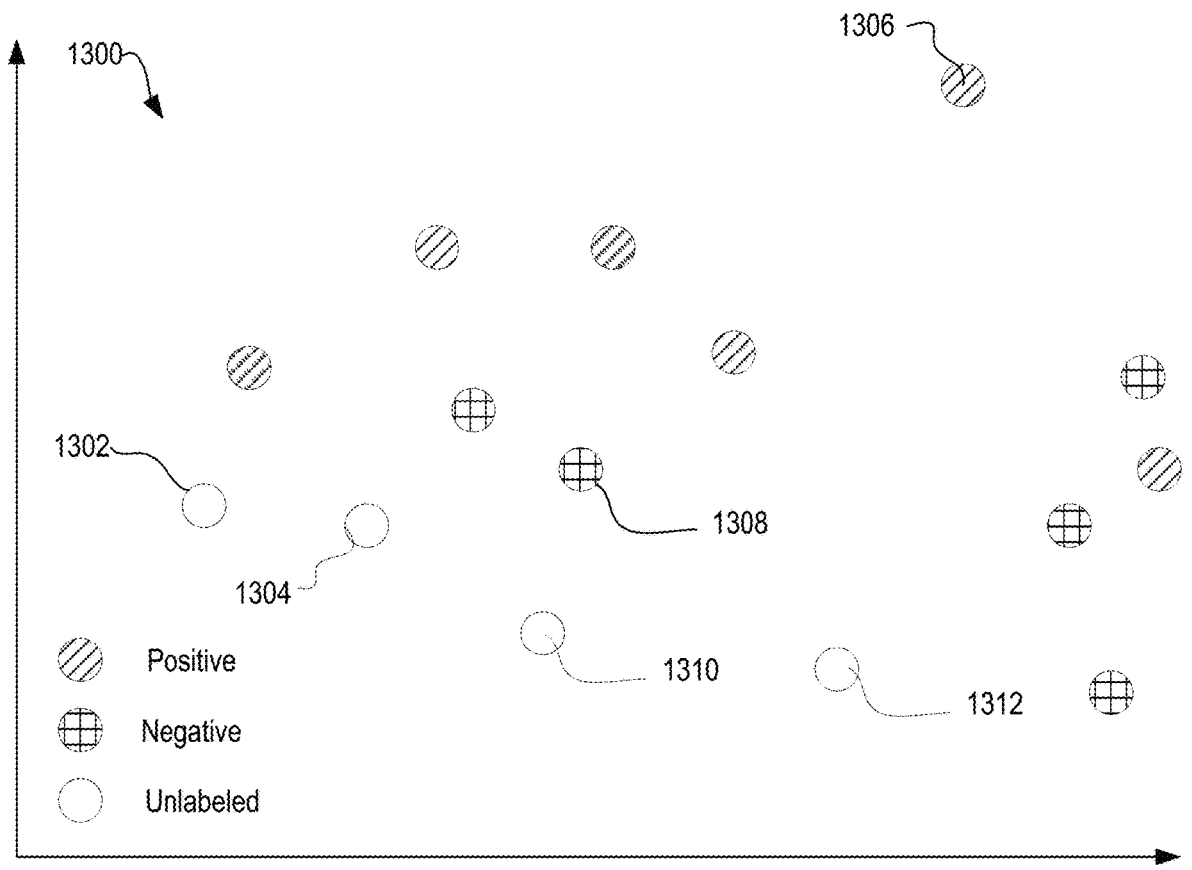

The selection model identifies target examples for labeling or verification by determining the n data points having the lowest confidence levels for the labels determined at step 1202 (step 1204) (n may be different than in step 804) and sets the labels determined for the data points as temporary labels for the data points (step 1205). For example, if n=2 (e.g., based on configuration), the selection model will select the two data points for which the classifier of the selection model has the lowest confidence in the labels it determined for the data points as the target data points and set the labels determined by the classifier as temporary labels for the target data points. Say the classifier of the selection model determines labels for unlabeled data points 1302, 1304, 1306, 1308, 1310, 1312 as illustrated in FIG. 13B and that the labels for data points 1306, 1308 are the two lowest confidence labels of the labels determined for unlabeled data points 1302, 1304, 1306, 1308, 1310, 1312, then assuming n=2 for the sake of example, the selection model will select data points 1306, 1308 as the dataset of interest (step 1204) and assign the labels determined by the classifier of the selection model as temporary labels (step 1206), while the other unlabeled data points 1302, 1304, 1310, 1312 remain in an unlabeled state, as illustrated in FIG. 13C.

In the foregoing example, the selection model selects the n most uncertain data points to label. Selection rules implementing other sampling techniques known or developed in the art can be used. By way of example, but not limitation, the selection model may select all the datapoints that have a confidence below a threshold level of uncertainty. As another example, the selection model may use weighted sampling in which lower confidence data points have a lower probability of being selected. Other selection techniques may also be used.

The examples labeled by the selection model are provided for verification (step 1208). For example, ML model training system 50 can route temporarily labeled examples represented by data points 1306, 1308 to verification interface 62 for verification of the temporary labels. As another example, ML model training system 102 can route labeled text segments 134 represented by data points 1306, 1308 to verification interface 117.

At step 1208, the ML model training system determines if a label assigned to a data point of interest is verified. If so, the temporary label is set as the training label for the example (step 1210). If the label is not verified, as determined at step 1208, the ML model training system receives a new label for the example and sets the new label as the training label for the example (step 1212).

For example, a verification interface (e.g., verification interface 62, verification interface 117 or other verification interface) can present each example labeled by a selection model to a user for verification (step 1206). More particularly, in some embodiments, the verification interface queries the user as to whether the labels assigned by the selection model are correct. The verification interface receives an input (e.g., based on user interaction with the verification interface) indicating that the user agrees with the label assigned to the example or indicating that another label is to be assigned to the example. Thus, a model training system can determine if a label is verified (step 1208). If the user verifies the label—that is, if the input indicates agreement with the assigned label—then the model training system sets the assigned label as a training label (step 1210). If the user changes the label for the example—for example, changes the label from "positive" to "negative"—the model training system sets the new label indicated for the example by the user as the training label for the example (step 1212). The examples represented by data points 1306, 1308, with their labels verified or corrected as needed, can be added to the set of labeled examples for further iterations or for training the ML classifier (see, e.g., step 316 of FIG. 3). In the embodiment illustrated, steps 1208-1212 can be repeated for each example in the dataset of interest (e.g., as determined at step 1214).

FIG. 12 is provided by way of example and not limitation. Various steps may be repeated, steps may be performed in different orders, steps omitted, and additional or alternative steps performed.

FIG. 14 is a flowchart illustrating one embodiment of a process 1400 for selecting and labeling examples using a reduced-dimension data space. Although the following discussion generally discusses process 1400 using the example of ML model training system 50 and ML model training system 102, it should be noted that the ML model training systems and process 1400 can be used independently of each other. Process 1400 may be embodied as a set of computer-executable instructions stored on a non-transitory, computer-readable medium, or otherwise implemented in an automated fashion, potentially with human input.

For the sake of example, the selection model is applied to a relatively small set of data points, for example based on a region selected by a user at step 704 of FIG. 7. However, it will be appreciated that process 1400 may also be applied to an automatically selected region, to a dataset that represents all the examples in the input dataset or to another target dataset.

According to the embodiment of FIG. 14, a selection model is adapted to classify interpolated examples to identify and label unlabeled examples with a low confidence classification. In such embodiments, the selection model may comprise a relatively simple classifier that is used to classify reduced-dimension representations of examples. In some embodiments, a relatively simple machine learning model (e.g., a single model or an ensemble of models) that does not require prior training is used. By way of example, but not limitation, a probabilistic classifier, such as a naive bayes or other nearest neighbor classification model that does not require prior training is used to classify interpolated data points.

Figure 15A:
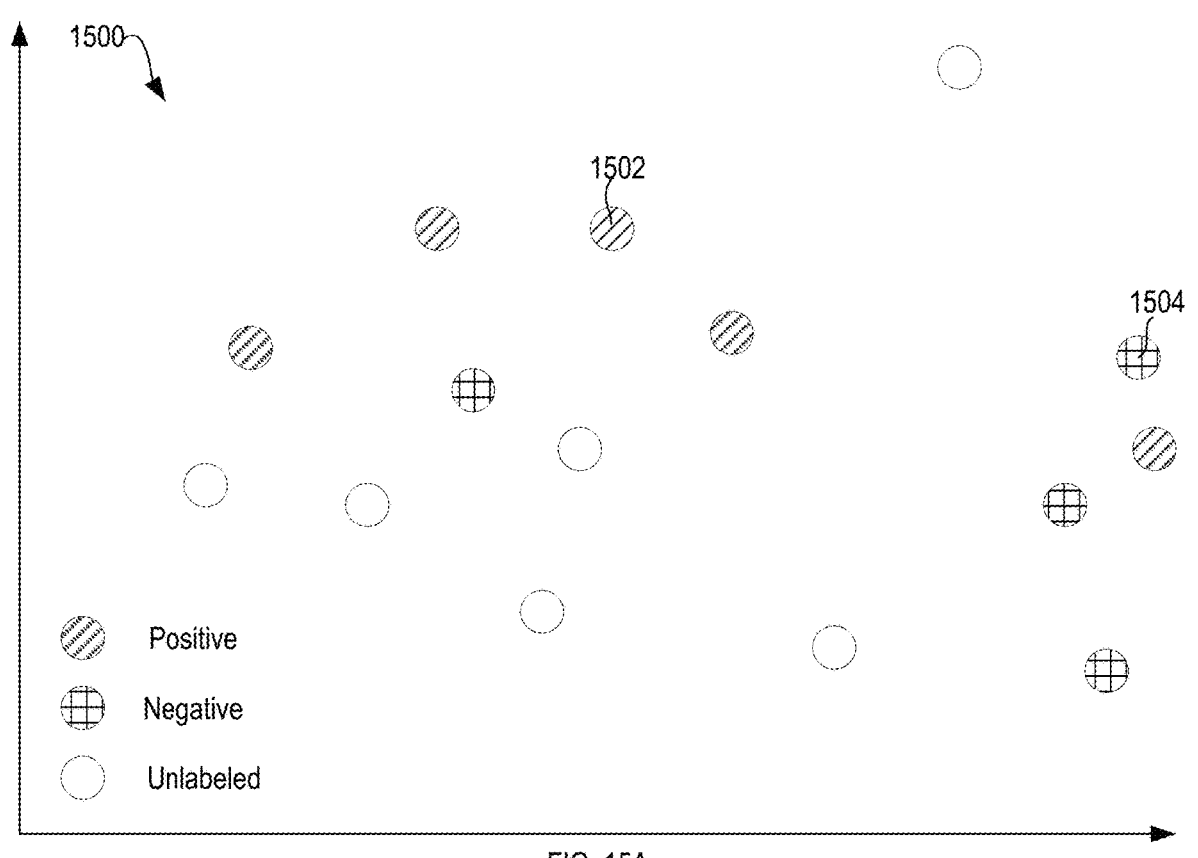
FIG. 15A, FIG. 15B, FIG. 15C, and FIG. 15D are a diagrammatic representation of one embodiment of labeling unlabeled data points based on an uncertainty criterion.

At step 1402, the selection model selects labeled data points having different labels as interpolation endpoints. Turning briefly to FIG. 15A, this figure depicts a portion of a reduced-dimension data space 1500 that includes a set of data points, each data point representing a labeled example (e.g., a labeled text segment) or an unlabeled example (e.g., an unlabeled text segment). In this example, data point 1502 and data point 1504 are selected as interpolation endpoints.

Figure 15B:
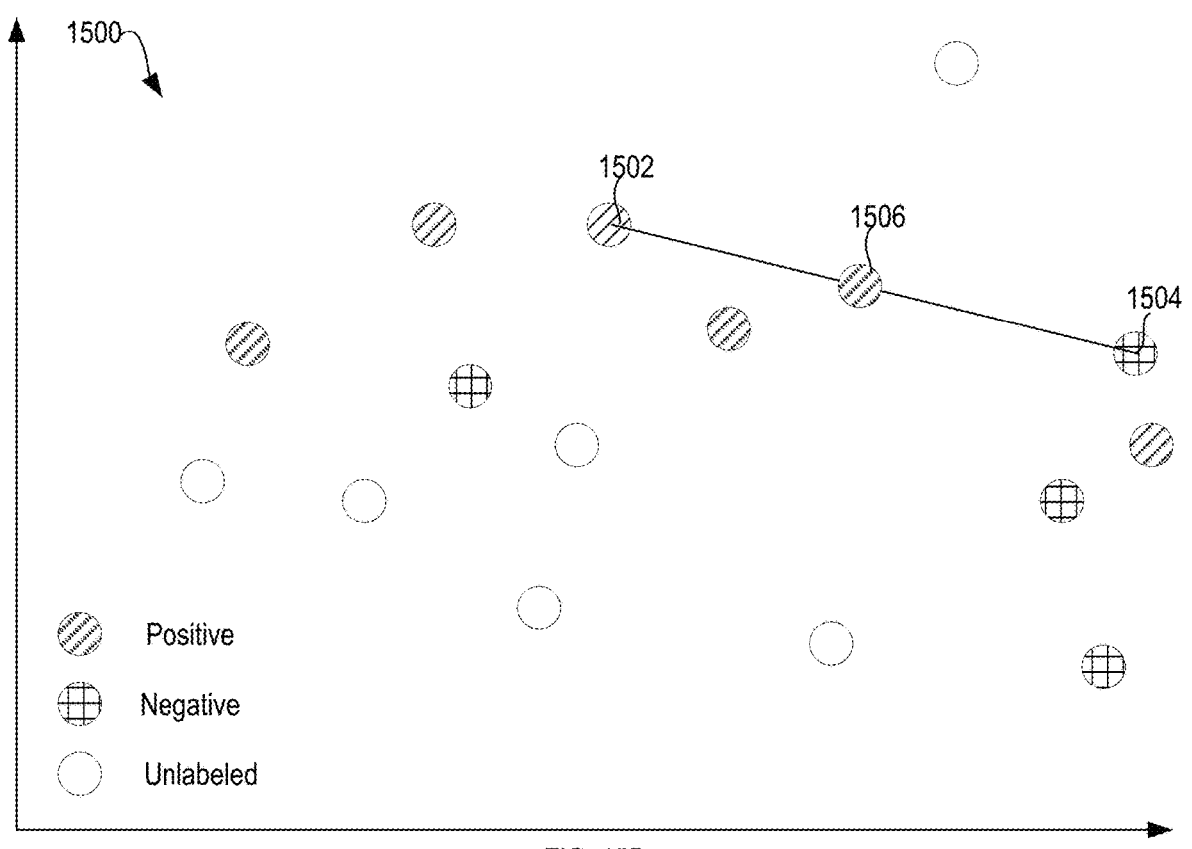

At step 1404, the selection model interpolates a temporary data point between the interpolation endpoints and assigns a temporary label and confidence to the temporary data point using the simple classifier. With reference to FIG. 15B, the selection model interpolates temporary data point 1506 between data point 1502 and data point 1504, assigns it a temporary data point label (e.g., "positive") and determines the confidence for the label.

At step 1406, the selection model determines if an uncertainty criterion is met (step 1406). If the uncertainty criterion is met, the selection model selects a target example for labeling by determining the unlabeled data point nearest to the current temporary data point in the reduced-dimension space (step 1410) and assigns the temporary data point label of the temporary data point to the unlabeled data point as a temporary label (step 1411). If the uncertainty criterion is not met, the selection model can continue to search along the line between the interpolation endpoints for a temporary endpoint that meets the uncertainty criterion. According to some embodiments, the selection model sets the temporary endpoint and the original endpoint having a different label than the temporary endpoint as the interpolation endpoints (step 1408) and control returns to step 1404. In some embodiments, the uncertainty criterion is that the confidence in the temporary data point label assigned to the temporary data point is at (or within some specified range of) of maximum uncertainty—for example, the confidence is 0.5 (or some specified range about 0.5).

Figure 15C:
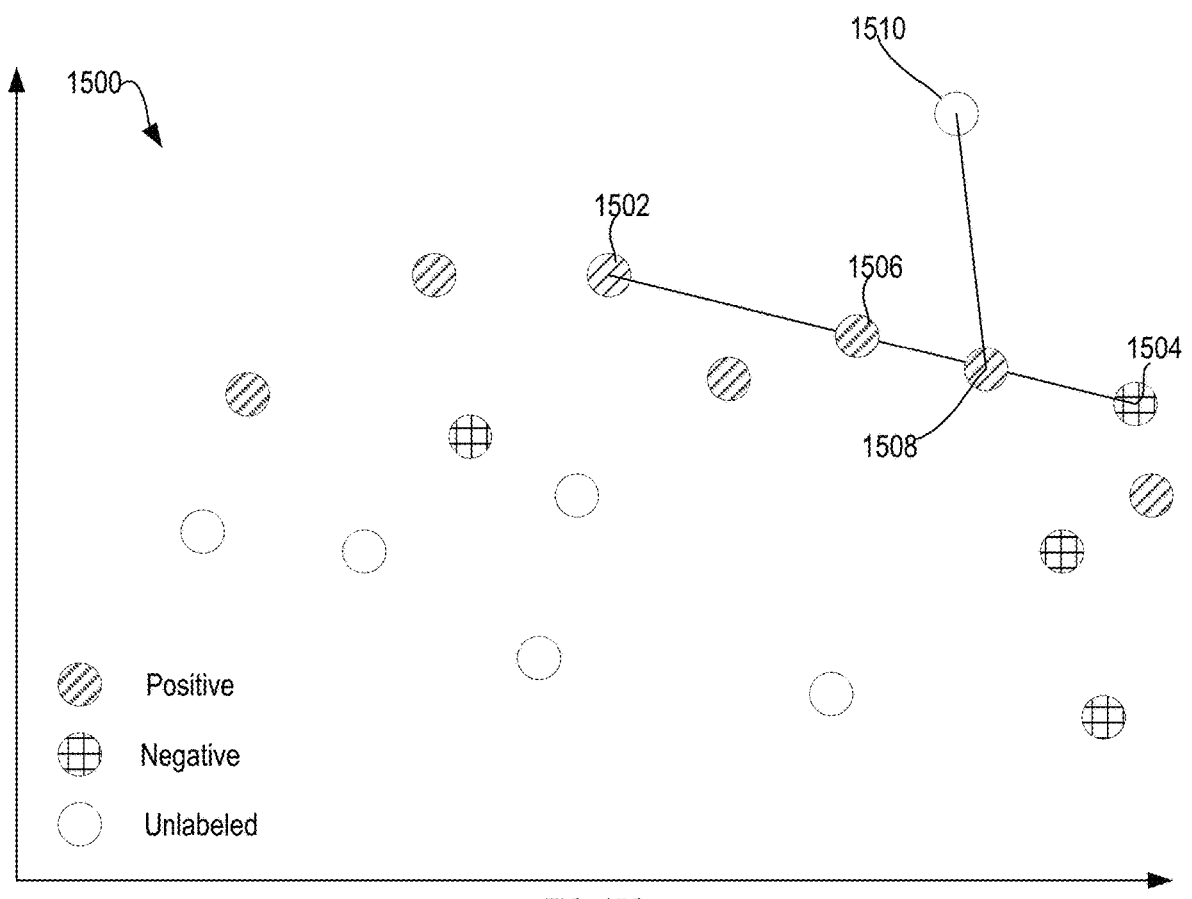
Figure 15D:
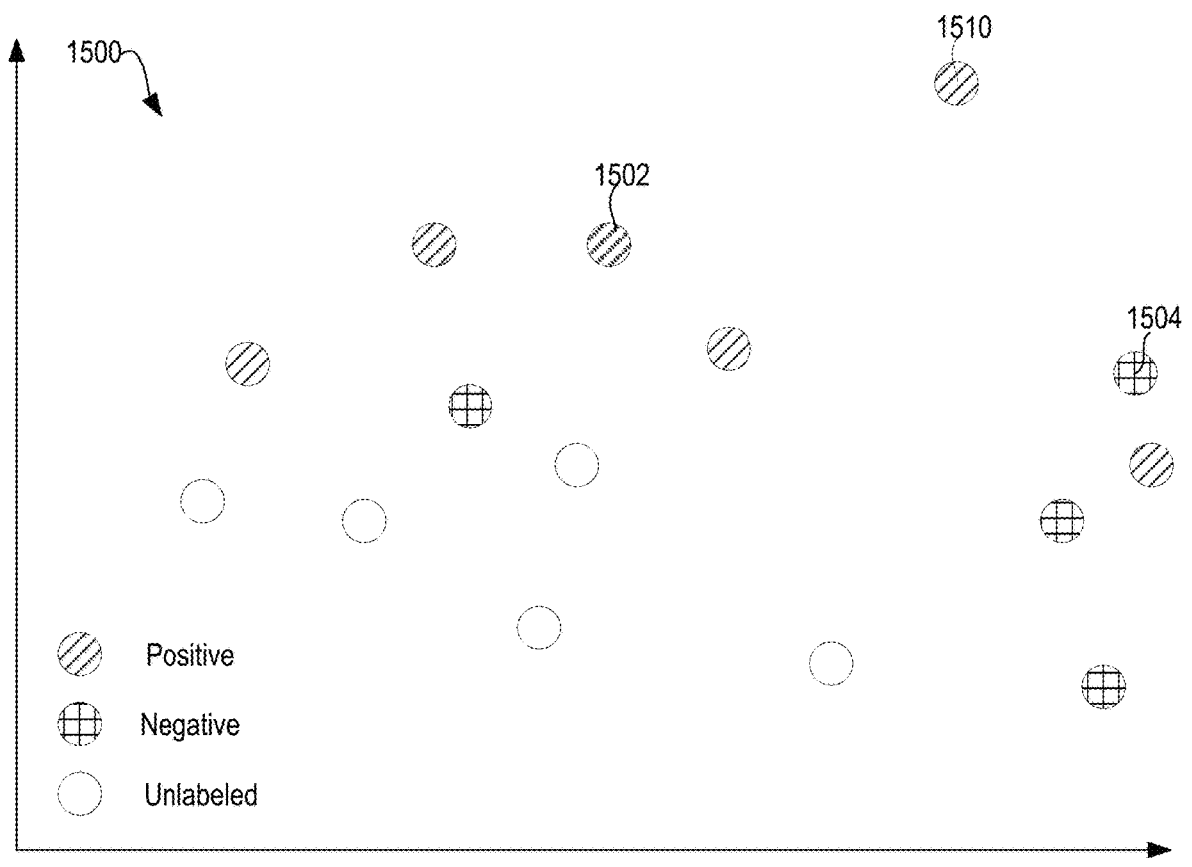

With reference to FIG. 15C, assuming the "positive" label for temporary data point 1506 did not meet the uncertainty criterion (as determined at step 1406), the selection model selects temporary data point 1506 and the original endpoint having a different label than temporary data point 1506—in this example, data point 1504—as interpolation endpoints (step 1408), interpolates another temporary data point 1508 between them, assigns a temporary data point label to temporary data point 1508 and determines a confidence in the temporary data point label (step 1404). Assuming in FIG. 15C that temporary data point 1508 meets the uncertainty criterion—for example, the confidence in the temporary data point label assigned to temporary data point 1508 is 0.5 or within a specified range of 0.5—the selection model identifies unlabeled data point 1510 as the nearest unlabeled data point to temporary data point 1508 (step 1410) and assigns the temporary data point label from temporary data point 1508 to unlabeled data point 1510 as a temporary label (step 1412). Thus, as illustrated in FIG. 15D, data point 1510 is assigned the temporary label of "positive."

The examples labeled by the selection model are provided for verification (step 1412). For example, ML model training system 50 can route a temporarily labeled example represented by data point 1510 to verification interface 62 for verification of the temporary label. As another example, ML model training system 102 can route a temporarily labeled text segment represented by data point 1510 to verification interface 117.

At step 1414, the ML model training system determines if a label assigned to a data point of interest is verified. If so, the temporary label is set as the training label for the example (step 1416). If the label is not verified, as determined at step 1414, the ML model training system receives a new label for the example and sets the new label as the training label for the example (step 1418).

For example, a verification interface (e.g., verification interface 62, verification interface 117 or other verification interface) can present each example labeled by a selection model to a user for verification (step 1414). More particularly, in some embodiments, the verification interface queries the user as to whether the labels assigned by the selection model are correct. The verification interface receives an input (e.g., based on user interaction with the verification interface) indicating that the user agrees with the label assigned to the example or indicating that another label is to be assigned to the example. Thus, a model training system can determine if a label is verified (step 1414). If the user verifies the label—that is, if the input indicates agreement with the assigned label—then the model training system sets the assigned label as a training label (step 1416). If the user changes the label for the example—for example, changes the label from "positive" to "negative"—the model training system sets the new label indicated for the example by the user as the training label for the example (step 1418). The training example represented by data point 1510, with its label verified or corrected as needed, can be added to the set of labeled examples for further iterations or for training the ML classifier (see, e.g., step 316 of FIG. 3). The steps of FIG. 14 may be repeated using different sets of interpolation endpoints to label additional unlabeled examples.

FIG. 14 is provided by way of example and not limitation. Various steps may be repeated, steps may be performed in different orders, steps omitted, and additional or alternative steps performed.

Figure 16:
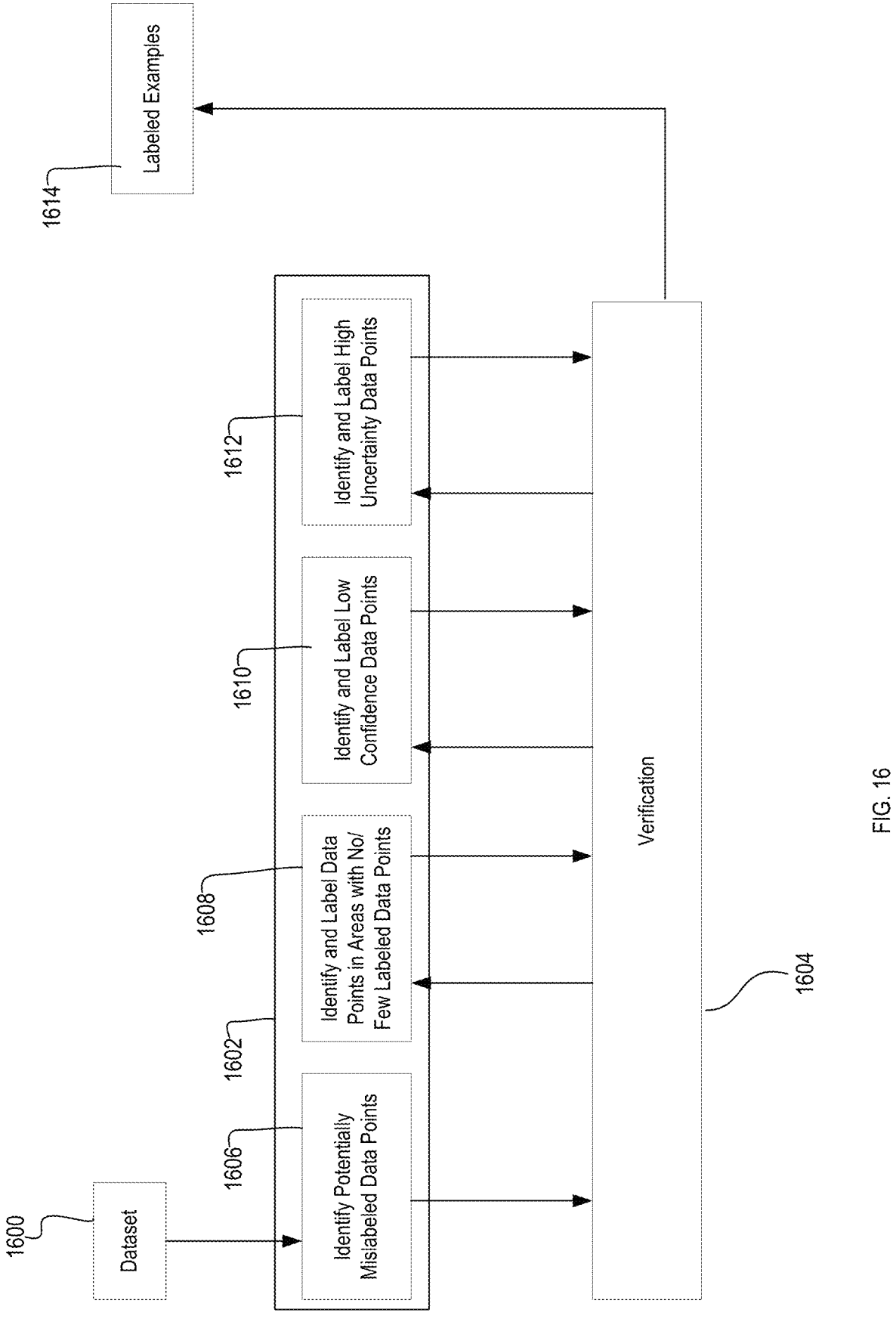
FIG. 16 is a block diagram providing a diagrammatic representation of one embodiment of a selection model.

As discussed previously, a selection model, such as selection model 116 of FIG. 2, may apply a variety of techniques to identify target examples for labeling or verification. With reference to FIG. 16, a diagrammatic representation of one embodiment of processing a reduced-dimension dataset 1600 to label unlabeled examples is provided. Dataset 1600 represents a target dataset for evaluation, such as a dataset representing a selected region of a larger dataset (e.g., as selected at step 704) or other dataset selected for evaluation by a selection model 1602, which represents one embodiment of selection model 116. A verification interface 1604 (e.g., verification interface 62, verification interface 117) provides an interface via which a user can verify or correct labels assigned to training examples.

In the embodiment of FIG. 16, selection model 1602 includes a first selection model 1606 that identifies potentially mislabeled examples from reduced-dimension dataset 1600. For example, selection model 1606 identifies, as a first set of target data points, the labeled data points in dataset 1600 for which the m nearest labeled data points have different labels than the identified data point. The labels for the first set of target data points are verified or corrected by a user via verification interface 1604.

Dataset 1600, with the labels for the first set of target data points verified or corrected by the user, is provided for evaluation to a second selection model 1608. Second selection model 1608 identifies a second set of target data points from dataset 1600. More particularly, the second selection model 1608 identifies unlabeled data points that are in areas with few or no labeled data points and assigns temporary labels to the second set of target data points. The temporary labels assigned to the second set of target data points are provided to verification interface 1604 for verification. The labels for the second set of target data points are verified or corrected by a user via verification interface.

Dataset 1600, with the labels for the first set of target data points and the second set of target data points verified or corrected by the user, is provided to a third selection model 1610 for evaluation. In this example, third selection model 1610 determines labels for unlabeled data points in dataset 1600 and identifies, as a third set of target data points, those data points for which the confidence in the determined label is below a threshold confidence level. Third selection model 1610 assigns temporary labels to the third set of target data points. The temporary labels assigned to the third set of target data points are provided to verification interface 1604 for verification. The labels for the third set of target data points are verified or corrected by a user via verification interface.

Dataset 1600, with the labels for the first set of target data points, the second set of target data points, and the third set of target data points, as verified or corrected by the user, is provided to a fourth selection model 1612 for evaluation. In this example, fourth selection model 1612, identifies unlabeled data points as a fourth set of target data points, using interpolated temporary data points meeting an uncertainty criterion and assigns temporary labels to the fourth set of target data points. The temporary labels assigned to the fourth set of target data points are provided to verification interface 1604 for verification. The labels for the fourth set of target data points are verified or corrected by a user via verification interface.

As such, an output dataset 1614 of labeled examples can be determined that includes labeled data points from input dataset 1600 (potentially as corrected or verified by a user if identified by first selection model 1606), and newly labeled examples labeled by selection models 1608, 1610, 1612 as verified or corrected by the user. Dataset 1614 can be combined with a set of unlabeled examples for a next iteration of labeling or to train a machine learning model.

FIG. 16 is provided by way of example. The selection models may be applied in different orders, selection models omitted, or other selection models incorporated.

Figure 17:
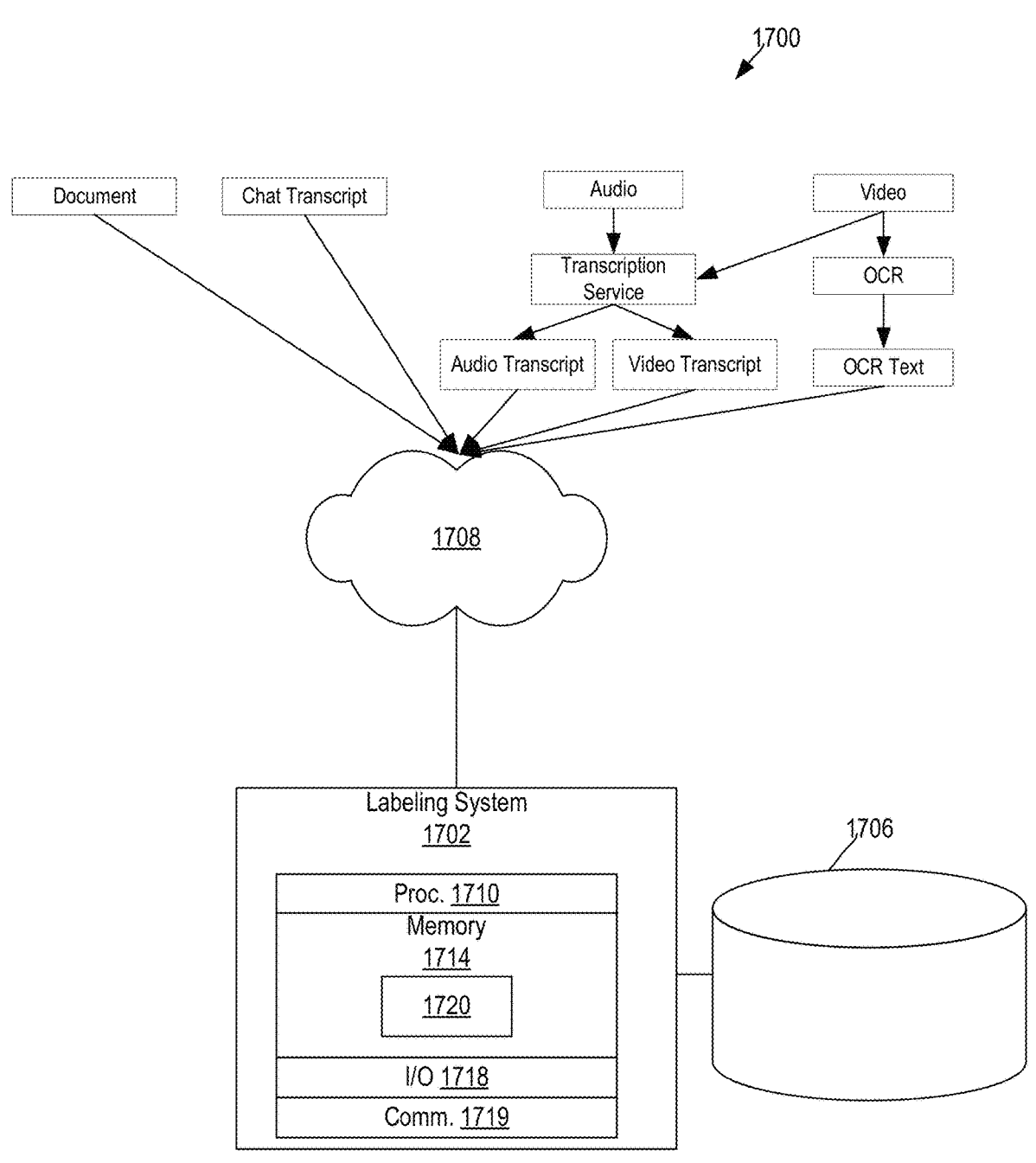
FIG. 17 is a diagrammatic representation of one embodiment of a computer system.

FIG. 17 is a diagrammatic representation of one embodiment of a system for labeling training data. In some embodiments, the system for labeling training data may implement an ML model training system, such as ML model training system 50 or ML model training system 102. The system for labeling training data may comprise a computer system executing instructions embodied on a computer-readable medium (e.g., one or more computer systems with central processing units executing instructions embodied on one or more computer-readable media) where the instructions are configured to perform at least some of the functionality associated with embodiments of the present invention. In the illustrated embodiment, system 1700 includes a computer system 1702 having a computer processor 1710 and associated memory 1714. Computer processor 1710 may be an integrated circuit for processing instructions. For example, computer processor 1710 may comprise one or more cores or micro-cores of a processor. Memory 1714 may include volatile memory, non-volatile memory, semi-volatile memory or a combination thereof. Memory 1714, for example, may include RAM, ROM, flash memory, a hard disk drive, a solid-state drive, an optical storage medium (e.g., CD-ROM), or other computer-readable memory or combination thereof. Memory 1714 may implement a storage hierarchy that includes cache memory, primary memory or secondary memory. In some embodiments, memory 1714 may include storage space on a data storage array. Computer system 1702 may also include input/output ("I/O") devices 1718, such as a keyboard, monitor, printer, electronic pointing device (e.g., mouse, trackball, stylus, etc.), or the like. Computer system 1702 may also include a communication interface 1719, such as a network interface card, to interface with network 1708, which may be a local LAN, a WAN such as the Internet, mobile network, or other type of network or combination thereof. Network 1708 may represent a combination of wired and wireless networks that may be utilized for various types of network communications.

Memory 1714 may store instructions executable by computer processor 1710. For example, memory 1714 may include code executable to provide an interface, such as an API or other interface to allow data sources to provide text (or other training data) over network 1708 to be analyzed. Memory 1714 includes instructions 1720 executable to provide a system to label training data. For example, memory 1714 may include code to implement an ML model training system. Memory 1714 may store configuration data, definitions of categories, numerical representations of concepts or segments of text or other data. Data store 1706, which may be part of or separate from memory 1714, may comprise one or more database systems, file store systems, or other systems to implement, for example, an object store to store various content.

Each of the computers in FIG. 16 may have more than one CPU, ROM, RAM, HD, I/O, or other hardware components. Portions of the methods described herein may be implemented in suitable software code that may reside within memory 1714 or other computer-readable memory.

Although the invention has been described with respect to specific embodiments thereof, these embodiments are merely illustrative, and not restrictive of the invention as a whole. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods, or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical, or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps, and operations described herein can be performed in hardware, software, firmware, or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non limiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer program product comprising a non-transitory, computer-readable medium storing thereon a set of computer-executable instructions, the set of computer-executable instructions comprising instructions for:

receiving an initial set of labeled examples and a set of unlabeled examples to be labeled, wherein the labeled and unlabeled examples comprise any modality such as language, images, audio, or mixtures thereof;

proceeding, starting with an input dataset that comprises the initial set of labeled examples and a first subset of unlabeled examples, to label the set of unlabeled examples in an iterative manner, with the input dataset for a next iteration comprising an augmented set of labeled examples from a current iteration and a selected subset of unlabeled examples, until a final set of labeled examples is created, wherein each iteration comprises:

embedding the input dataset into a fixed high-dimensional embedding;

mapping the embedded input dataset to a reduced-dimension space using the labeled data as a guide, the reduced-dimension space comprising labeled data points representing the labeled examples in the input dataset and unlabeled data points representing the unlabeled examples in the input dataset;

identifying a target example from the reduced-dimension space;

assigning a temporary label to the target example;

providing the temporary label for verification by a user;

assigning a training label to the target example based on a result of the verification by the user;

selecting potentially erroneous user supplied labels for validation against heuristics; and training a machine learning model with the final set of labeled examples.

2. The computer program product of claim 1, wherein the instructions for assigning the training label to the target example based on the result of the verification comprise instructions for:

based on the result of the verification indicating that the user verified the temporary label, assigning the temporary label to the target example as the training label; and based on the result of the verification indicating a selection by the user of an alternate label for the target example, assigning the alternate label to the target example as the training label.

3. The computer program product of claim 1, wherein the set of computer-executable instructions further comprises instructions for:

providing a graphical user interface representing the reduced-dimension space; and receiving a selection of an area of interest based on user interaction with the graphical user interface, wherein the target example is identified by identifying a target data point representing the target example from the area of interest.

4. The computer program product of claim 1, wherein each iteration comprises determining a distance of an unlabeled data point to a nearest labeled data point in the reduced-dimension space, wherein identifying the target example comprises identifying the unlabeled data point as a target data point based on the distance from the unlabeled data point to the nearest labeled data point, wherein the target data point represents the target example.

5. The computer program product of claim 4, wherein assigning the temporary label to the target example comprises assigning a label of the nearest labeled data point to the unlabeled data point as the temporary label.

6. The computer program product of claim 4, wherein determining the distance of the unlabeled data point to the nearest labeled data point in the reduced-dimension space comprises determining the distance of the unlabeled data point to a plurality of nearest labeled data points, wherein identifying the unlabeled data point as the target data point based on the distance from the unlabeled data point to the nearest labeled data point comprises identifying the unlabeled data point as the target data point based on the distances from the unlabeled data point to the plurality of nearest labeled data points, and wherein assigning the temporary label to the target data point comprises applying a labeling rule to assign a label from the plurality of nearest labeled data points as the temporary label.

7. The computer program product of claim 1, wherein the set of computer-executable instructions comprises instructions for:

selecting a previously user assigned label for verification based on a number of proximate labeled data points having a different label than a selected labeled data point;

presenting the previously assigned label for verification;

based on an indication that the user verified the previously assigned label, indicating that the label assigned to an example represented by the selected labeled data point is verified; and based on a selection by the user of a second label, assigning the second label to the example represented by the selected labeled data point as the training label.

8. The computer program product of claim 1, wherein each iteration comprises assigning a provisional label and a calculated confidence score for that labeling to an unlabeled data point, and wherein identifying the target example comprises identifying the unlabeled data point as a target data point for labeling verification by a human based on the confidence score, the target data point representing the target example.

9. The computer program product of claim 1, wherein identifying the target example comprises:

selecting a pair of labeled data points from the reduced-dimension space;

proceeding, starting with the pair of labeled data points as a set of interpolation endpoints, to interpolate a temporary data point between the set of interpolation endpoints and assign the temporary data point a temporary data point label and a confidence score in an iterative manner, with the temporary data point and an endpoint from the set of interpolation endpoints that has a different label than the temporary data point acting as the set of interpolation endpoints for a next iteration, until a confidence score criterion is met; and based on a determination that the confidence score criterion is met, identifying a first data point as a target data point for labeling and verification based on a distance between the first data point to the temporary data point, wherein the target data point represents the target example.

10. The computer program product of claim 1, wherein assigning the training label to the target example based on the result of the verification further comprises training the machine learning model to classify examples according to multiple categories.

11. The computer program product of claim 1, wherein assigning the training label to the target example based on the result of the verification further comprises training multiple machine learning classifiers.

12. A computer-implemented method for model training comprising:

receiving an initial set of labeled examples and a set of unlabeled examples to be labeled, wherein the labeled and unlabeled examples comprise any modality such as language, images, audio, or mixtures thereof;

proceeding, starting with an input dataset that comprises the initial set of labeled examples and a first subset of unlabeled examples, to label the set of unlabeled examples in an iterative manner, with the input dataset for a next iteration comprising an augmented set of labeled examples from a current iteration and a selected subset of unlabeled examples, until a final set of labeled examples is created, wherein each iteration comprises:

embedding the input dataset into a fixed high-dimensional embedding;

mapping the embedded input dataset to a reduced-dimension space using the labeled data as a guide, the reduced-dimension space comprising labeled data points representing the labeled examples in the input dataset and unlabeled data points representing the unlabeled examples in the input dataset;

identifying a target example from the reduced-dimension space;

assigning a temporary label to the target example;

providing the temporary label for verification by a user in a user interface;

assigning a training label to the target example based on a result of the verification by the user;

selecting potentially erroneous user supplied labels for validation against heuristics; and training a machine learning model with the final set of labeled examples.

13. The computer-implemented method of claim 12, wherein assigning the training label to the target example based on the result of the verification by the user comprises:

based on the result of the verification indicating that the user verified the temporary label, assigning the temporary label to the target example as the training label.

14. The computer-implemented method of claim 12, wherein assigning the training label to the target example based on the result of the verification by the user comprises:

based on the result of the verification indicating a selection by the user of an alternate label for the target example, assigning the alternate label to the target example as the training label.

15. The computer-implemented method of claim 12, further comprising:

providing a graphical user interface representing the reduced-dimension space; and receiving a selection of an area of interest based on user interaction with the graphical user interface, wherein the target example is identified by identifying a target data point representing the target example from the area of interest.

16. The computer-implemented method of claim 12, wherein each iteration comprises determining a distance of an unlabeled data point to a nearest labeled data point in the reduced-dimension space, wherein identifying the target example comprises identifying the unlabeled data point as a target data point based on the distance from the unlabeled data point to the nearest labeled data point, wherein the target data point represents the target example.

17. The computer-implemented method of claim 16, wherein assigning the temporary label to the target example comprises assigning a label of the nearest labeled data point to the unlabeled data point as the temporary label.

18. The computer-implemented method of claim 16, wherein determining the distance of the unlabeled data point to the nearest labeled data point in the reduced-dimension space comprises determining the distance of the unlabeled data point to a plurality of nearest labeled data points, wherein identifying the unlabeled data point as the target data point based on the distance from the unlabeled data point to the nearest labeled data point comprises identifying the unlabeled data point as the target data point based on the distances from the unlabeled data point to the plurality of nearest labeled data points, and wherein assigning the temporary label to the target data point comprises applying a labeling rule to assign a label from the plurality of nearest labeled data points as the temporary label.

19. The computer-implemented method of claim 12, further comprising:

selecting a previously user assigned label for verification based on a number of proximate labeled data points having a different label than a selected labeled data point;

presenting the previously assigned label to the user for verification; and based on an indication that the user verified the previously assigned label, indicating that the label assigned to an example represented by the selected labeled data point is verified.

20. The computer-implemented method of claim 12, further comprising:

selecting a previously user assigned label for verification based on a number of proximate labeled data points having a different label than a selected labeled data point;

presenting the previously assigned label to the user for verification; and based on an indication that the user has selected a second label, changing the label assigned to an example represented by the selected labeled data point.

21. The computer-implemented method of claim 12, wherein each iteration comprises assigning a provisional label and a calculated confidence score for that labeling to an unlabeled data point, and wherein identifying the target example comprises identifying the unlabeled data point as a target data point for labeling verification by a human based on the confidence score, the target data point representing the target example.

22. The computer-implemented method of claim 12, wherein identifying the target example comprises:

selecting a pair of labeled data points from the reduced-dimension space;

proceeding, starting with the pair of labeled data points as a set of interpolation endpoints, to interpolate a temporary data point between the set of interpolation endpoints and assign the temporary data point a temporary data point label and a confidence score in an iterative manner, with the temporary data point and an endpoint from the set of interpolation endpoints that has a different label than the temporary data point acting as the set of interpolation endpoints for a next iteration, until a confidence score criterion is met; and based on a determination that the confidence score criterion is met, identifying a first data point as a target data point for labeling and verification based on a distance between the first data point to the temporary data point, wherein the target data point represents the target example.

23. A system for sample-efficient training of model training comprising:

a processor;

a computer program product comprising a non-transitory, computer-readable medium storing thereon a set of computer-executable instructions, the set of computer-executable instructions comprising instructions for:

receiving an initial set of labeled examples and a set of unlabeled examples to be labeled, wherein the labeled and unlabeled examples comprise any modality such as language, images, audio, or mixtures thereof;

proceeding, starting with an input dataset that comprises the initial set of labeled examples and a first subset of unlabeled examples, to label the set of unlabeled examples in an iterative manner, with the input dataset for a next iteration comprising an augmented set of labeled examples from a current iteration and a selected subset of unlabeled examples, until a final set of labeled examples is created, wherein each iteration comprises:

embedding the input dataset into a fixed high-dimensional embedding;

mapping the embedded input dataset to a reduced-dimension space using the labeled data as a guide, the reduced-dimension space comprising labeled data points representing the labeled examples in the input dataset and unlabeled data points representing the unlabeled examples in the input dataset;

identifying a target example from the reduced-dimension space;

assigning a temporary label to the target example;

providing the temporary label for verification by a user;

assigning a training label to the target example based on a result of the verification by the user;

selecting potentially erroneous user supplied labels for validation against heuristics; and training a machine learning model with the final set of labeled examples.

24. The system of claim 23, wherein at least as subset of the initial set of labeled examples is labeled by a fuzzy rules-based labeler and wherein mapping the input dataset to the reduced-dimension space comprises applying uniform manifold approximation and projection.

25. The system of claim 24, wherein the set of computer-executable instructions comprises instructions for:

selecting a previously assigned label for verification based on a number of proximate labeled data points having a different label than a selected labeled data point;

presenting the previously assigned label for verification;

based on an indication that the user verified the previously assigned label, indicating that the label assigned to an example represented by the selected labeled data point is verified; and based on a selection by the user of a second label, assigning the second label to the example represented by the selected labeled data point as the training label.

26. The system of claim 23, wherein identifying the target example comprises identifying a target data point that represents the target example from the reduced-dimension space, identifying the target data point comprising at least one of:

determining the distances of an unlabeled data point to a plurality of nearest labeled data points, identifying the unlabeled data point as the target data point based on the distances from the unlabeled data point to the plurality of nearest labeled data points;

assigning a confidence score for a label to the unlabeled data point and selecting the unlabeled data point as the target data point based on the confidence score for the label assigned to the unlabeled data point; or proceeding, starting with a pair of labeled end points selected from the reduced-dimension space as a set of interpolation endpoints, to interpolate a temporary data point between the set of interpolation endpoints and assign the temporary data point a temporary data point label and a confidence score in the temporary data point label in an iterative manner, with the temporary data point and an endpoint from the set of interpolation endpoints that has a different label than the temporary data point acting as the set of interpolation endpoints for a next iteration, until a confidence score criterion is met, and based on a determination that the confidence score criterion is met, identifying a first data point as the target data point.

\* \* \* \* \*